United States Patent
Bagherinia et al.

(10) Patent No.: US 10,169,864 B1
(45) Date of Patent: Jan. 1, 2019

(54) METHODS AND SYSTEMS TO DETECT AND CLASSIFY RETINAL STRUCTURES IN INTERFEROMETRIC IMAGING DATA

(71) Applicant: Carl Zeiss Meditec, Inc., Dublin, CA (US)

(72) Inventors: Homayoun Bagherinia, Oakland, CA (US); Luis De Sisternes, Dublin, CA (US)

(73) Assignee: CARL ZEISS MEDITEC, INC., Dublin, CA (US)

( * ) Notice: Subject to any disclaimer, the term of this patent is extended or adjusted under 35 U.S.C. 154(b) by 51 days.

(21) Appl. No.: 15/246,036

(22) Filed: Aug. 24, 2016

Related U.S. Application Data

(60) Provisional application No. 62/210,953, filed on Aug. 27, 2015.

(51) Int. Cl.
   *G06K 9/00* (2006.01)
   *G06T 7/00* (2017.01)

(52) U.S. Cl.
   CPC .. *G06T 7/0012* (2013.01); *G06T 2207/10101* (2013.01); *G06T 2207/20081* (2013.01); *G06T 2207/30041* (2013.01)

(58) Field of Classification Search
   CPC ............ G06T 2207/30041; G06T 2207/10101
   See application file for complete search history.

(56) References Cited

U.S. PATENT DOCUMENTS

| | | | |
|---|---|---|---|
| 6,120,461 A * | 9/2000 | Smyth | A61B 3/113 600/558 |
| 8,571,278 B2 | 10/2013 | Sonka et al. | |
| 8,811,745 B2 | 8/2014 | Farsiu et al. | |
| 9,563,975 B2 * | 2/2017 | Yamanashi | G06T 11/60 |
| 2002/0041259 A1 * | 4/2002 | Lewis | G02B 27/0093 345/7 |
| 2007/0230795 A1 | 10/2007 | Abramoff et al. | |

(Continued)

OTHER PUBLICATIONS

Amditis et al., "Multiple Hypothesis Tracking Implementation", Chapter 10, Laser Scanner Technology, Mar. 28, 2012, pp. 199-220.

(Continued)

*Primary Examiner* — Oneal R Mistry
(74) *Attorney, Agent, or Firm* — Morrison & Foerster LLP

(57) ABSTRACT

Methods and systems are presented to analyze a retinal image of an eye and assigns features to known anatomical structures such as retinal layers. One example method includes receiving interferometric image data of an eye. A set of features is identified in the image data. A first subset of identified features is associated with known retinal structures using prior knowledge. A first set of characteristic metrics is determined of the first subset of features. A second set of characteristic metrics is determined of a second subset of features. Using the characteristic metrics of the first and the second sets, the second subset of features is associated with the retinal structures. Another example method includes dividing interferometric image data into patches. The image data in each patch is segmented to identify one or more layer boundaries. The segmentation results from each patch are stitched together into a single segmentation dataset.

16 Claims, 18 Drawing Sheets

(56) References Cited

U.S. PATENT DOCUMENTS

| | | | | |
|---|---|---|---|---|
| 2012/0184845 | A1* | 7/2012 | Ishikawa | A61B 3/102 600/425 |
| 2014/0135747 | A1* | 5/2014 | Donitzky | A61F 9/00827 606/4 |

OTHER PUBLICATIONS

Anantrasirichai et al., "SVM-Based Texture Classification in Optical Coherence Tomography", IEEE 10th International Symposium on Biomedical Imaging, 2013, 4 pages.

Bogunovic et al., "Multi-Surface and Multi-Field Co-Segmentation of 3-D Retinal Optical Coherence Tomography", IEEE Transactions on Medical Imaging, vol. 33, No. 12, 2014, pp. 1-12.

Cabrera et al., "Automated Detection of Retinal Layer Structures on Optical Coherence Tomography Images", Optics Express, vol. 13, No. 25, Dec. 12, 2005, pp. 10200-10216.

Camilus et al., "A Review on Graph Based Segmentation", International Journal of Image, Graphics and Signal Processing, No. 5, 2012, pp. 1-13.

Canny et al., "A Computational Approach to Edge Detection", IEEE Transactions on Pattern Analysis and Machine Intelligence, vol. PAMI-8, No. 6, Nov. 1986, pp. 679-698.

Cha, Sung-Hyuk, "Comprehensive Survey on Distance/Similarity Measures between Probability Density Functions", International Journal of Mathematical Models and Methods in Applied Sciences, vol. 1, No. 4, 2007, pp. 300-307.

Chen et al., "Automated Choroid Segmentation based on Gradual Intensity Distance in HD-OCT Images", Optics Express, vol. 23, No. 7, Apr. 6, 2015, pp. 8974-8994.

Chen et al., "Peripapillary Retinal Nerve Fiber Layer Vascular Microcirculation in Glaucoma using Optical Coherence Tomography-based Microangiography", Investigative Ophthalmology & Visual Science, vol. 57, No. 9, 2016, pp. 475-485.

Chiu et al., "Automatic Segmentation of Seven Retinal Layers in SDOCT Images Congruent with Expert Manual Segmentation", Optics Express, vol. 18, No. 18, Aug. 30, 2010, pp. 19413-19428.

Chiu et al., "Kernel Regression based Segmentation of Optical Coherence Tomography Images with Diabetic Macular Edema", Biomedical Optics Express, vol. 6, No. 4, Apr. 1, 2015, pp. 1172-1194.

Debuc et al., "A Review of Algorithms for Segmentation of Retinal Image Data using Optical Coherence Tomography", Chapter-2, Image Segmentation, 2011, pp. 15-55.

Dufour et al., "Automatic Segmentation of Intraretinal Layers from Optical Coherence Tomography Images", Summer School on Graphs in Computer Graphics, Image and Signal Analysis, Aug. 14-19, 2011, 1 page.

Dufour et al., "Graph-Based Multi-Surface Segmentation of OCT Data using Trained Hard and Soft Constraints", IEEE Transactions on Medical Imaging, vol. 32, No. 3, Mar. 2013, pp. 531-543.

Fabritius et al., "Automated Segmentation of the Macula by Optical Coherence Tomography", Optics Express, vol. 17, No. 18, Aug. 31, 2009, pp. 15659-15669.

Garvin et al., "Automated 3-D Intraretinal Layer Segmentation of Macular Spectral-Domain Optical Coherence Tomography Images", IEEE Transactions on Medical Imaging, vol. 28, No. 9, Sep. 2009, pp. 1436-1447.

Garvin et al., "Intraretinal Layer Segmentation of Macular Optical Coherence Tomography Images using Optimal 3-D Graph Search", IEEE Transactions Medical Imaging, vol. 27, No. 10, Oct. 2008, pp. 1495-1505.

Huang et al., "Development of a Semi-Automatic Segmentation Method for Retinal OCT Images Tested in Patients with Diabetic Macular Edema", Plos One, vol. 8, No. 12, Dec. 2013, pp. 1-6.

Jonnal et al., "The Cellular Origins of the Outer Retinal Bands in Optical Coherence Tomography Images", Investigative Ophthalmology & Visual Science, vol. 55, No. 12, Dec. 2014, pp. 7904-7918.

Kafieh et al., "A Review of Algorithms for Segmentation of Optical Coherence Tomography from Retina", Journal of Medical Signals & Sensors, vol. 3, No. 1, Jan.-Mar. 2013, pp. 45-60.

Kafieh et al., "Intra-Retinal Layer Segmentation of 3D Optical Coherence Tomography using Coarse Grained Diffusion Map", Medical Image Analysis, vol. 17, No. 8, Dec. 2013, 30 pages.

Kafieh et al., "Intra-Retinal Layer Segmentation of Optical Coherence Tomography using Diffusion Map", IEEE International Conference on Acoustics, Speech and Signal Processing, 2013, pp. 1080-1084.

Kajic et al., "Robust Segmentation of Intraretinal Layers in the Normal Human Fovea using a Novel Statistical Model Based on Texture and Shape Analysis", Optics Express, vol. 18, No. 14, Jul. 5, 2010, pp. 14730-14744.

Karri et al., "Learning Layer-Specific Edges for Segmenting Retinal Layers with Large Deformations", Biomedical Optics Express, vol. 7, No. 7, Jul. 1, 2016, pp. 2888-2901.

Koozekanani et al., "Retinal Thickness Measurements from Optical Coherence Tomography using a Markov Boundary Model", IEEE Transactions on Medical Imaging, vol. 20, No. 9, Sep. 2001, pp. 900-916.

Kovesi, Peter., "Phase Congruency Detects Corners and Edges", Proc. VIIth Digital Image Computing: Techniques and Applications, Dec. 10-12, 2003, pp. 309-318.

Li et al., "Optimal Surface Segmentation in Volumetric Images—A Graph-Theoretic Approach", IEEE Transactions on Pattern Analysis and Machine Intelligence, vol. 25, No. 1, Jan. 2006, pp. 119-134.

Lujan et al., "Revealing Henle's Fiber Layer Using Spectral Domain Optical Coherence Tomography", Investigative Ophthalmology & Visual Science, vol. 52, No. 3, Mar. 2011, pp. 1486-1492.

Mayer et al., "Automatic Nerve Fiber Layer Segmentation and Geometry Correction on Spectral Domain OCT Images using Fuzzy C-means Clustering", Investigative Ophthalmology & Visual Science, vol. 49, May 2008, p. 1880.

Mayer et al., "Retinal Nerve Fiber Layer Segmentation on FD-OCT Scans of Normal Subjects and Glaucoma Patients", Biomedical Optics Express, vol. 1, No. 5, Dec. 1, 2010, pp. 1358-1383.

Mishra et al., "Intra-Retinal Layer Segmentation in Optical Coherence Tomography Images", Optics Express, vol. 17, No. 26, Dec. 21, 2009, pp. 23719-23728.

Mujat et al., "Retinal Nerve Fiber Layer Thickness Map Determined from Optical Coherence Tomography Images", Optics Express, vol. 13, No. 23, Nov. 14, 2005, pp. 9480-9491.

Naseri et al., "Automatic Detection of Retina Layers using Texture Analysis", International Journal of Computer Applications, vol. 46, No. 1, May 2012, pp. 29-33.

Nillius et al., "Multi-Target Tracking—Linking Identities using Bayesian Network Inference", IEEE Computer Society Conference on Computer Vision and Pattern Recognition, vol. 2, 2006, 8 pages.

Parker, J. R., "Algorithms for Image Processing and Computer Vision", Second Edition, Wiley Publications, 2011, 48 pages.

Quellec et al., "Three-Dimensional Analysis of Retinal Layer Texture: Identification of Fluid-Filled Regions in SD-OCT of the Macula", IEEE Transactions Medical Imaging, vol. 29, No. 6, Jun. 2010, pp. 1321-1330.

Rathke et al., "Probabilistic Intra-Retinal Layer Segmentation in 3-D OCT Images using Global Shape Regularization", Medical Image Analysis, vol. 18, 2014, pp. 781-794.

Salvi et al., "A Graph-Based Algorithm for Multi-Target Tracking with Occlusion", Proceedings of the 2013 IEEE Workshop on Applications of Computer Vision, Jan. 1-17, 2013, pp. 489-496.

Singh et al., "Pedestrian Tracking by Associating Tracklets using Detection Residuals", Proceedings of the 2008 IEEE Workshop on Motion and Video Computing, Jan. 8-9, 2008, 8 pages.

Song et al., "Optimal Multiple Surface Segmentation with Shape and Context Priors", IEEE Transactions on Medical Imaging, vol. 32, No. 2, Feb. 2013, pp. 376-386.

Srinivasan et al., "Automatic Segmentation of up to Ten Layer Boundaries in SD-OCT Images of the Mouse Retina with and without Missing Layers due to Pathology", Biomedical Optics Express, vol. 5, No. 2, Feb. 1, 2014, pp. 348-365.

(56) References Cited

OTHER PUBLICATIONS

Timp et al., "A New 2D Segmentation Method Based on Dynamic Programming applied to Computer Aided Detection in Mammography", Medical Physics, vol. 31, No. 5, May 2004, pp. 958-971.

Tolliver et al., "Automatic Multiple Retinal Layer Segmentation in Spectral Domain OCT Scans via Spectral Rounding", Investigative Ophthalmology & Visual Science, vol. 49, May 2008, 2 pages.

Tolliver et al., "Unassisted Segmentation of Multiple Retinal Layers via Spectral Rounding", 2008, 1 page.

Vermeer et al., "Automated Segmentation by Pixel Classification of Retinal Layers in Ophthalmic OCT Images", Biomedical Optics Express, vol. 2, No. 6, Jun. 1, 2011, pp. 1743-1756.

Wassenberg et al., "An Efficient Parallel Algorithm for Graph-Based Image Segmentation", Proceedings of the 13th International Conference on Computer Analysis of Images and Patterns, 2009, pp. 1-10.

Yazdanpanah et al., "Segmentation of Intra-Retinal Layers from Optical Coherence Tomography Images using an Active Contour Approach", IEEE Transactions on Medical Imaging, vol. 30, No. 2, Feb. 2011, pp. 484-496.

Zawadzki et al., "Adaptation of a Support Vector Machine Algorithm for Segmentation and Visualization of Retinal Structures in Volumetric Optical Coherence Tomography Data Sets", Journal of Biomedical Optics, vol. 12, No. 4, Jul./Aug. 2007, pp. 041206-1-041206-8.

Zawadzki et al., "Adaptive Optics—Optical Coherence Tomography: Optimizing Visualization of Microscopic Retinal Structures in Three Dimensions", Journal of the Optical Society of America. A, Optics, Image Science, and Vision, vol. 24, No. 5, 2007, pp. 1373-1383.

Zhu et al., "FloatingCanvas: Quantification of 3D Retinal Structures from Spectral-Domain Optical Coherence Tomography", Optics Express, vol. 18, No. 24, Nov. 22, 2010, pp. 24595-24610.

\* cited by examiner

METHODS AND SYSTEMS TO DETECT AND CLASSIFY RETINAL STRUCTURES IN INTERFEROMETRIC IMAGING DATA

PRIORITY

This application claims priority to U.S. Provisional Application Ser. No. 62/210,953 filed Aug. 27, 2015, the contents of which are hereby incorporated by reference.

TECHNOLOGICAL FIELD

The present application concerns improved methods and systems for detecting and identifying structures in images obtained with interferometric imaging systems.

BACKGROUND

A wide variety of interferometric imaging techniques have been developed to provide high resolution structural information in a wide range of applications. Optical Coherence Tomography (OCT) is a technique for performing high-resolution cross-sectional imaging that can provide images of samples including tissue structure on the micron scale in situ and in real time. OCT is an interferometric imaging method that determines the scattering profile of a sample along the OCT beam by detecting light reflected from a sample combined with a reference beam. Each scattering profile in the depth direction (z) is called an axial scan, or A-scan. Cross-sectional images (B-scans), and by extension 3D volumes, are built up from many A-scans, with the OCT beam moved to a set of transverse (x and y) locations on the sample. Many variants of OCT including time-domain OCT (TD-OCT), frequency domain or Fourier-Domain OCT (FD-OCT) (including spectral-domain OCT (SD-OCT) and swept-source OCT (SS-OCT)), have been developed employing different combinations of light sources, scanning configurations, and detection schemes. In parallel techniques, a series of spots, a line of light (line-field), or a two-dimensional array of light (full-field or partial field) are directed to the sample. The resulting reflected light is combined with reference light and detected. Parallel techniques can be accomplished in TD-OCT, SD-OCT or SS-OCT configurations. The related fields of optical diffraction tomography, holoscopy, digital interference holography, holographic OCT, and interferometric synthetic aperture microscopy are also interferometric imaging techniques that can be accomplished in point scanning and parallel configurations.

Interferometric imaging techniques have been applied extensively in the field of ophthalmology. OCT systems are able to image the various layers of the retina of the eye. FIG. 1 illustrates an OCT B-scan image 100 representing various canonical retinal layers and boundaries, which may include the inner limiting membrane (ILM) (as indicated by reference numeral 102), the retinal nerve fiber layer (RNFL or NFL) (as indicated by reference numeral 104), the ganglion cell layer (GCL) (as indicated by reference numeral 106), the inner plexiform layer (IPL) (as indicated by reference numeral 108), the inner nuclear layer (INL) (as indicated by reference 110), the outer plexiform layer (OPL) (as indicated by reference numeral 112), the outer nuclear layer (ONL) (as indicated by reference numeral 114), and the junction between the outer segments (OS) and inner segments (IS), as indicated by reference numeral 116, of the photoreceptors. The external or outer limiting membrane (ELM or OLM) (indicated by reference numeral 118) is the layer between the nuclei of the photoreceptors and their inner segments. Reference numerals 120 and 122 represent the retinal pigment epithelium (RPE) and bruch's membrane (BM), respectively. The purpose of segmentation in OCT imaging of the retina can be one of the following: (1) to detect a boundary between two structures, as in the junction between the inner and outer segments (IS/OS), which typically appears as a bright line in the OCT image (see for example, Jonnal et al. 2014, 'The Cellular Origins of the Outer Retinal Bands in Optical Coherence Tomography Images,' IOVS 55, 7904-7918, hereby incorporated by reference), or (2) to detect a layer that is represented as a single location, such as the RPE, which again appears as a bright line in the OCT image, or (3) to detect a layer with axial extent, such as the RNFL, which will have an inner boundary (which will be anatomically the border between the RNFL and the inner limiting membrane, but may be detected just as the ILM itself) and an outer boundary (which will be anatomically the border between the nerve fiber axon bundles and the nuclei in the ganglion cell layer). There is much overlap in these cases, as the RPE for some purposes may be considered to have an axial extent that may be associated with disease, but in most cases it is treated as a single axial location which determines the outer boundary of the retinal tissue. Segmentation of a layer that has an axial extent by definition implies identification of the inner boundary and outer boundary of that layer.

Pathologies of the eye are often present as structural and intensity modifications of the affected area in the OCT images. Further, because of the functional specificity of the various layers of the retina, different pathologies may affect only a specific subset of the various layers, while sparing the rest of the retinal constitution. This results in a change in a spatial relationship between various retinal layers, and quantifying this change is often a good indicator of an evolving or developed ocular pathology. Changes to thicknesses of retinal layers can also be used to identify and monitor various pathologies. Vital to establishing the extent and progression of retinal diseases is the ability to separate or segment the various retinal structures such as retinal layers, boundaries, and anatomical structures from pathologies.

Segmentation is the partitioning of an image into parts that are coherent according to some criteria, such as being anatomically related. When considered as a classification task, the purpose of segmentation is to assign labels to individual pixels or voxels within the image data. Some segmentation approaches (e.g., neural-based) perform segmentation 1) directly on the pixel data, 2) by preprocessing the intensity data, and/or 3) by using local structures provided to a classifier. Segmentation is a non-trivial operation requiring substantial computational resources. Often it is performed in a serial manner—beginning with an obvious structure (e.g., the ILM) and, with assumptions, additional structures are then located and segmented. A review of segmentation approaches is given in DuBuc D. C. 2011, Chap. 2, in Image Segmentation, Ed. P.-G. Ho, Pub: InTech, 15-54, hereby incorporated by reference.

In order to make OCT datasets clinically useful it is necessary to analyze the structure by segmentation of layers. However, due to the sheer amount of data, it is inconvenient or even impossible for a human operator to manually perform the segmentation in a high throughput clinical environment. Therefore, it is necessary to develop effective computer algorithms for automated segmentation of relevant layers of the investigated tissue, especially ones that can deliver results in a real-time or near real-time environment.

Existing published approaches to retinal OCT data segmentation vary depending on the number of layers to be segmented and on their robustness in the presence of strong speckle noise, shadows, irregularities (i.e. vessels, structural changes at the fovea and/or optic nerve head) and pathological changes in the tissue. (see for example, Fabritius, Tapio, et al. "Automated segmentation of the macula by optical coherence tomography." Optics express 17.18 (2009): 15659-15669; Zawadzki, Robert J., et al. "Adaptive optics-optical coherence tomography: optimizing visualization of microscopic retinal structures in three dimensions." JOSA A 24.5 (2007): 1373-1383; Garvin, Mona K., et al. "Intraretinal layer segmentation of macular optical coherence tomography images using optimal 3-D graph search." IEEE transactions on medical imaging 27.10 (2008): 1495-1505; Camilus & Govindan 2012, 'A Review of Graph Based Segmentation,' MECS, Ind. J. Graphics and Signal Proc. 5, 1-13; Fernandez, *Delia* Cabrera, Harry M. Salinas, and Carmen A. Puliafito. "Automated detection of retinal layer structures on optical coherence tomography images." Optics Express 13.25 (2005): 10200-10216; Mujat, Mircea, et al. "Retinal nerve fiber layer thickness map determined from optical coherence tomography images." Optics Express 13.23 (2005): 9480-9491; Koozekanani, Dara, Kim Boyer, and Cynthia Roberts. "Retinal thickness measurements from optical coherence tomography using a Markov boundary model." IEEE transactions on medical imaging 20.9 (2001): 900-916; Tolliver, D. A., et al. "Automatic multiple retinal layer segmentation in spectral domain oct scans via spectral rounding." Investigative Ophthalmology & Visual Science 49.13 (2008): 1878-1878; and Mishra, Akshaya, et al. "Intra-retinal layer segmentation in optical coherence tomography images." Optics express 17.26 (2009): 23719-23728, the contents of each of which are hereby incorporated by reference). In general, segmentations tend to be very sensitive to noisy data or are limited only to a small number of layers. The previously mentioned segmentation approaches are beset with one or more of the following disadvantages: 1) they distinguish only the most prominent layers, 2) do not exhibit robustness in noisy and varied cases, 3) often require manual intervention of the operator; 4) are specific to a subset of retinal layers, 5) cannot deal with the range of retinal pathologies that could be present, 6) are computationally and execution-time intense, and 7) often require a classification system based upon an external reference database. Moreover, they are static systems in an application that requires dynamic decisions.

SUMMARY OF INVENTION

Systems and methods of the present application are directed towards improved segmentation of interferometric image data. In one aspect of the present invention, a workflow in which OCT data is preprocessed to be divided into regions of common size, resolution, alignment, intensity and statistical properties is described. Such division allows the processing of image data of different extent, scan pattern acquisition parameters, complexity, illumination conditions and pathologies by the same segmentation workflow in a reliable and controlled manner. Processing divided regions of such characteristics independently provides more robust results and decreases the computational requirements of the segmentation algorithm. In addition, constraining each segmentation problem to regions of data having reduced span and common characteristics allows for the statistical properties of the pixels surrounding a particular retinal layer to be more similar within the region, which helps in the association of locations belonging to the same retinal layer.

In another aspect of the present invention, a segmentation approach in which a set of features (e.g., edges; surface(s) of retinal layer(s), each surface consisting of two or more edges in two or more B-scans; region(s) (i.e., a portion of B-scan representing retinal layer(s)); and a volume comprising two or more regions in two or more B-scans, etc.) in the OCT data are identified and characteristic metrics on and about these features are derived. The collection of these metrics define a multidimensional hyperspace with various retinal structures occupying subspaces therein. An assignment of a first subset of features can be performed to recognizable retinal structures or layers, based upon minimal a priori criteria. For those features that do not satisfy all of these minimal a priori criteria (i.e., a second subset of features), the characteristic information (characteristic/statistical metrics) derived from the first set of features is then applied to analyze and to classify the second subset of features to the structures. This can be a subspace-analysis, an iterative approach, or it can be based upon a cascaded filter network, in which a feature (such as an edge, connected edge, segment) passing a certain filter subjects that feature to yet another filter, etc. A preferred approach is to identify subspaces within a hyperspace defined by a set of characteristic scalars or metrics derived initially from recognizing the origin of a segment or connected region, based on minimal a priori knowledge, using characteristic information.

In yet another aspect of the present invention, an algorithm to provide an initial estimation of the retinal boundaries in OCT image data is presented. This initial estimation is based on common properties observed in retinal boundaries (for example, such that boundaries should not cross each other) and analysis of the features and metrics identified in the segmentation approach discussed above.

Yet another aspect of the present invention describes an algorithm for the simultaneous refinement of a given set of retinal boundaries employing the results of the initial estimation. This refinement considers the possible interaction within the given boundaries in three dimensions and its core employs an additional segmentation algorithm that can be of different nature (e.g., a graph-based segmentation algorithm (see for example, Timp, Sheila, and Nico Karssemeijer. "A new 2D segmentation method based on dynamic programming applied to computer aided detection in mammography." Medical physics 31.5 (2004): 958-971, hereby, incorporated by reference)).

The various aspects/embodiments of the present application discussed above are able to locate and to associate features with different retinal structures or layers based upon characteristic information: location, connectedness, and statistical properties. This includes the possible variation of boundaries of anatomical structures as well as textural information of those structures. The preprocessing step in which the data is divided into regions of common statistical properties that are processed independently allows each identifiable feature within a region to share common characteristic information. This approach offers greater flexibility over the fixed constraints on layer smoothness, since it learns from the data what amount of variability is possible and in what regions, while on the other hand, constrains data to a plausible space of states. Moreover, the methods and systems discussed herein are completely self-contained in learning: meaning that each image provides the information required to train a classifier. Note that a dataset can consist of a single B-scan, multiple B-scans at the approximate same location, or it can be volumetric, comprising a plurality of B-scans at multiple locations. In the case of volumetric datasets, the information derived from the features of a B-scan can be used to identify the features of an adjacent scan, in short, e.g. the statistical metrics of one B-scan could be used for subsequent B-scans in a vicinity of the B-scans.

In an iterative approach, the subspace defined by the characteristic metrics are revised when one or more new features have been recognized and their characteristic metrics or a set of filters have been updated in the hyperspace. The remaining features are then subjected to the updated characteristic information found in the hyperspace. Thus this approach is capable of segmenting multiple retinal layers simultaneously. In addition, it is applicable to structures created by pathological conditions, including, but not limited to, drusen, geographic atrophy, exudates, pigment epithelial detachment, epiretinal membranes, microaneurysms, and anything that causes a structural departure from what is considered to be a normal or healthy retina.

Embodiments are presented to associate, link, or stitch the detected segments or 3-dimensional connected sub-regions into longer segments or sub-regions that can be ultimately assigned to a retinal layer or structure. This may include multi-hypothesis tracking and the Kuhn-Munkres approach, but other approaches of associating segments are also applicable.

A unified or coherent segmentation system or method needs to accommodate any retinal scan, whether the contrast be low or high, or one beset with pathological irregularities. Thus, the present application embodies a common framework for: the preprocessing and processing of images, and, the detection and classification of features to retinal structures. These embodiments are dynamic and adaptable, which significantly reduces redundant processing, while also reducing the segmentation error.

BRIEF DESCRIPTION OF DRAWINGS

FIG. 8a shows a B-scan of a healthy retina while FIG. 8b shows an example of a retina with abnormalities.

FIGS. 10b-10e show probability distribution functions for each of the sub-regions in FIG. 10a.

FIG. 11a shows a B-scan of a healthy retina. FIG. 11b shows the same B-scan as in FIG. 11a, but with segmentations of the layers achieved according to embodiments of the present application overlaid. FIG. 11c is a B-scan of an unhealthy retina while FIG. 11d is the same B-scan showing the resulting segmentations.

DETAILED DESCRIPTION

All patent and non-patent references cited within this specification are herein incorporated by reference in their entirety to the same extent as if the disclosure of each individual patent and non-patient reference was specifically and individually indicated to be incorporated by reference in its entirely.

Figure 1:
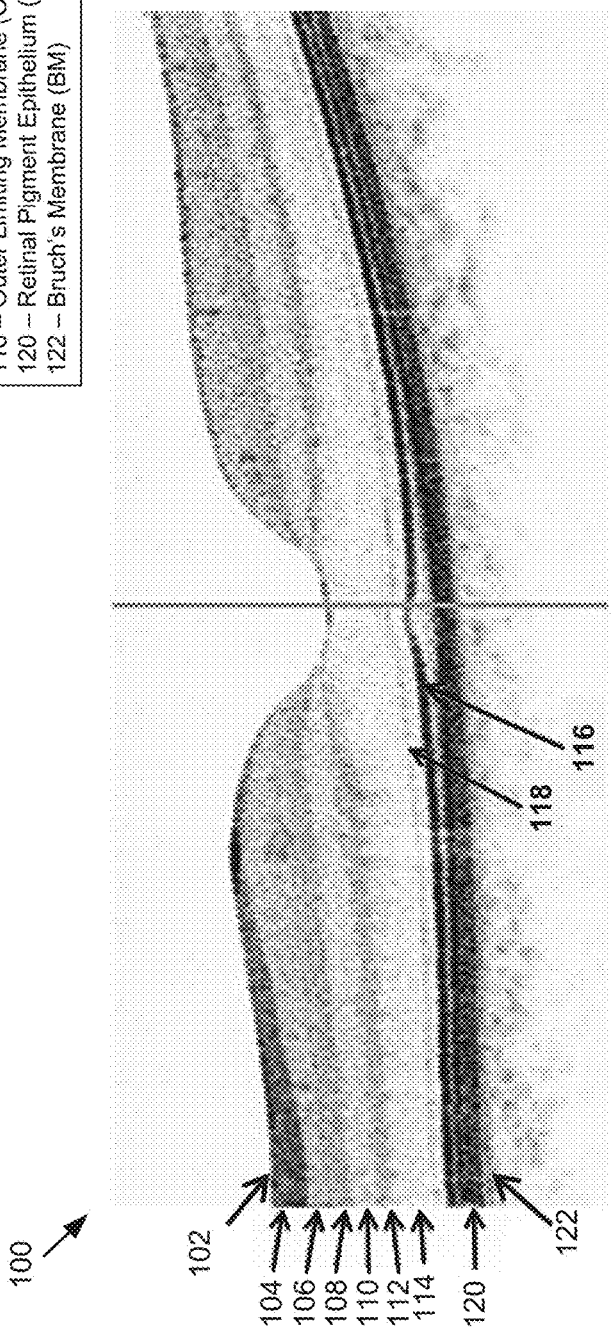
FIG. 1 is an optical coherence tomography (OCT) image of a normal retina of a human eye. The OCT image shows various canonical retinal layers and boundaries.
Figure 2:
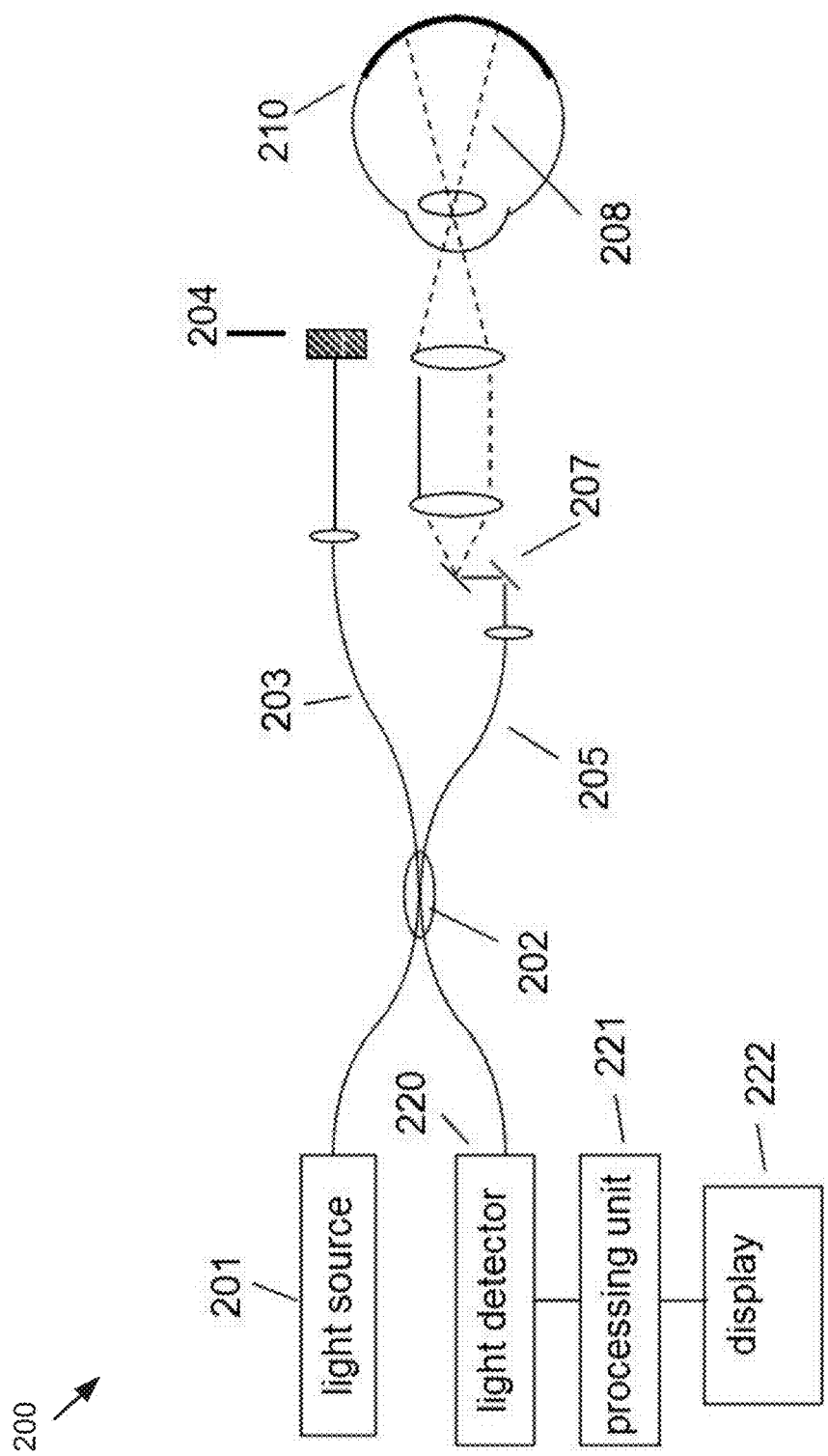
FIG. 2 is a basic schematic of a fourier-domain OCT (FD-OCT) system that can be used to practice the present invention.

FIG. 2 illustrates a generalized Fourier Domain optical coherence tomography (FD-OCT) system 200 that is used to collect an OCT dataset suitable for use with the present set of embodiments. As depicted, the FD-OCT system 200 includes a light source 201, typical sources including, but not limited to, broadband light sources with short temporal coherence lengths or swept laser sources. Light from source 201 is routed, typically by optical fiber 205, to illuminate the sample 210, which could be any of the tissues or structures within an eye. The light is scanned, typically with a scanner 207 between the output of the fiber and the sample, so that the beam of light (dashed line 208) is scanned over a plurality of transverse (x and y locations) defining the imaged region. One skilled in the art would appreciate that alternative illumination approaches such as multi-spot, line field, partial field, full field could alternatively employed to deliver light to a region of the eye. Light beam as used herein should be interpreted as any carefully directed light path. Light scattered from the sample is collected, typically into the same fiber 205 used to route the light for illumination. Reference light derived from the same source 201 travels a separate path, in this case involving fiber 203 and retroreflector 204. Those skilled in the art recognize that a transmissive reference path or arm can also be used. The delay difference between the reference and sample arms determines what axial locations of the sample is imaged. The delay difference can be controlled by adjusting a delay line in either the reference or sample arms of the system or changing the location of the patient relative to the instrument along the direction of the light path. Delay adjustment as used herein refers to any adjustment that alters the optical path length difference between sample and reference arms. The sample and reference arms in the interferometer could consist of bulk-optics, fiber-optics or hybrid bulk-optic systems and could have different architectures such as Michelson, Mach-Zehnder, or common-path based designs as would be known by those skilled in the art. Collected sample light is combined with reference light, typically in a fiber coupler 202, to form light interference in a detector 220 and said detector generating signals in response to the interfering light. The output from the detector is supplied to a processing unit 221 where the results can be stored or further processed and/or displayed on display 222.

The processing unit 221 may be localized within the OCT instrument or may be external to the OCT. In this latter case, the datasets are transferred thereto. This unit could be dedicated to data processing or perform other tasks that are quite general and not dedicated to the OCT device. The display can also provide a user interface for the instrument operator to control the collection and analysis of the data. The interface could contain knobs, buttons, sliders, touch screen elements or other data input devices as would be well known to someone skilled in the art. The processing unit 221 can comprise one or more processors including those of the parallel processing type such as GPUs, FPGAs, or multi-core processors.

The interference between the light returning from the sample and from the reference arm causes the intensity of the interfered light to vary across the spectrum. The Fourier transform of the interference light reveals the profile of scattering intensities at different path lengths, and therefore scattering as a function of depth (z-direction) in the sample. The scattering profile as a function of depth is called an axial scan (A-scan). A set of A-scans measured at neighboring locations in the sample produces a cross-sectional image (tomogram or B-scan) of the sample. A collection of B-scans makes up a data cube or volume. It should be noted, however, that the application of these methods need not be limited to data acquired via FD-OCT; they could be applied to data acquired via any interferometric imaging techniques capable of collecting depth resolved retinal image data. The classification and segmentations approaches described herein could be applied to any type of interferometric image data, not just OCT.

OCT images are often preprocessed to reduce speckle noise, artifacts, and effects due to motion. The latter aspect usually involves shifting A-scans to establish a uniform z-dimension, and the B-scans are usually shifted, rotated, and scaled due to optical and motion effects. In the case of large datasets (e.g., volumetric), it is often advantageous to reduce the size of the image by binning or by selecting a certain subset of pixels. Moreover, images can be cropped to select a region of interest. The image is also processed to flatten it for display and further processing.

Segmentation and Classification Approaches

Figure 3:
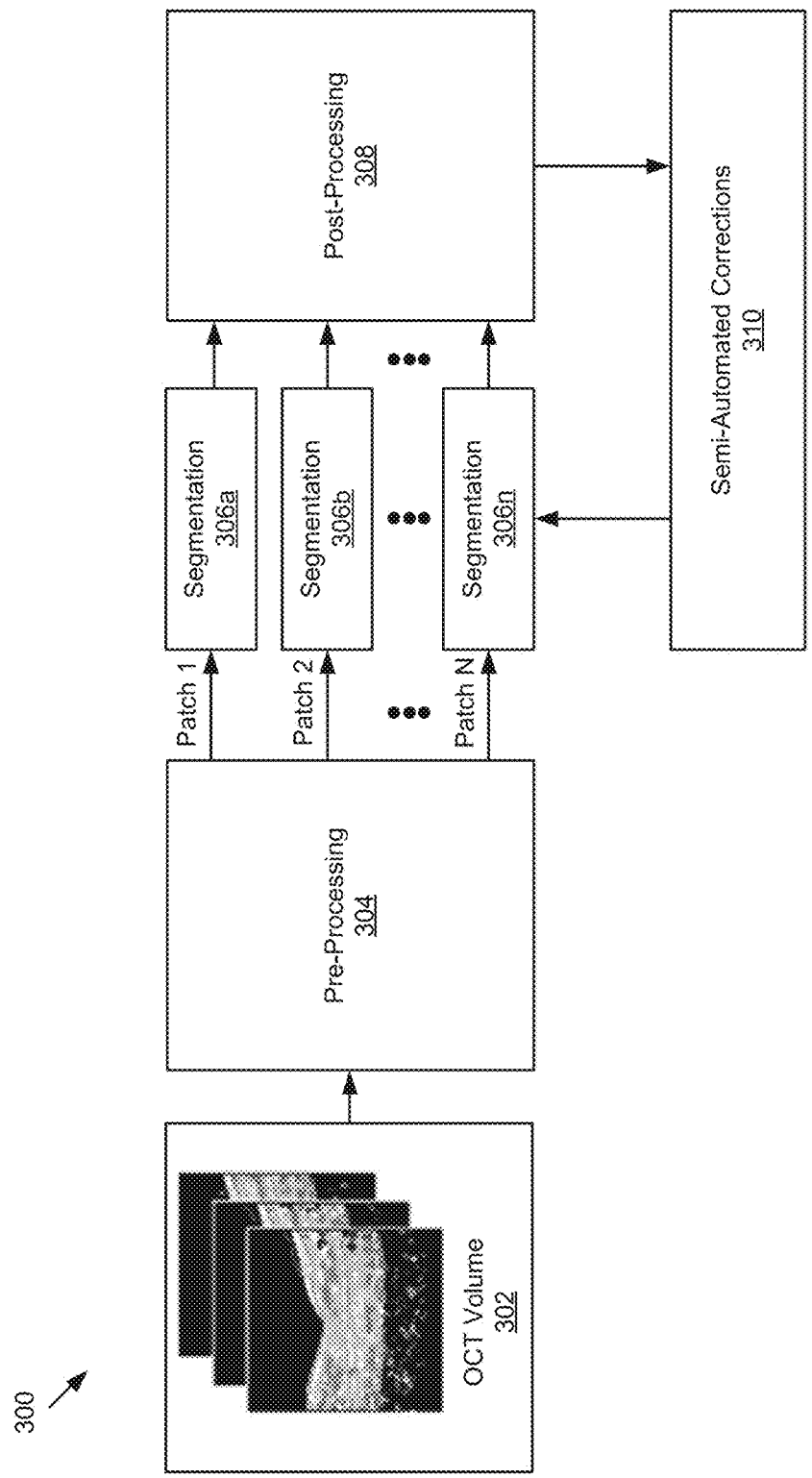
FIG. 3 illustrates a general segmentation workflow for processing varied OCT data.

FIG. 3 illustrates a general segmentation workflow 300 according to one embodiment of the present invention. An OCT volume or image 302 is preprocessed (step 304) to be divided in volume patches (patches 1 through N) of defined span, overlap region between patches, resolution, alignment and illumination characteristics so that data to be later processed presents a relative uniformity that warrantees robustness in the subsequent processing steps. These patches (patches 1 through N) are then segmented independently (306a through 306n, herein individually and collectively referred to as 306) and later stitched together in a post-processing step 308. Although the segmentation is intended to be fully automated, the workflow 300 also allows for later semi-automated corrections 310, where regions of possibly erroneous segmentation can be manually indicated and their corresponding patches get re-processed (i.e., re-segmented) for more accurate results.

Figure 4:
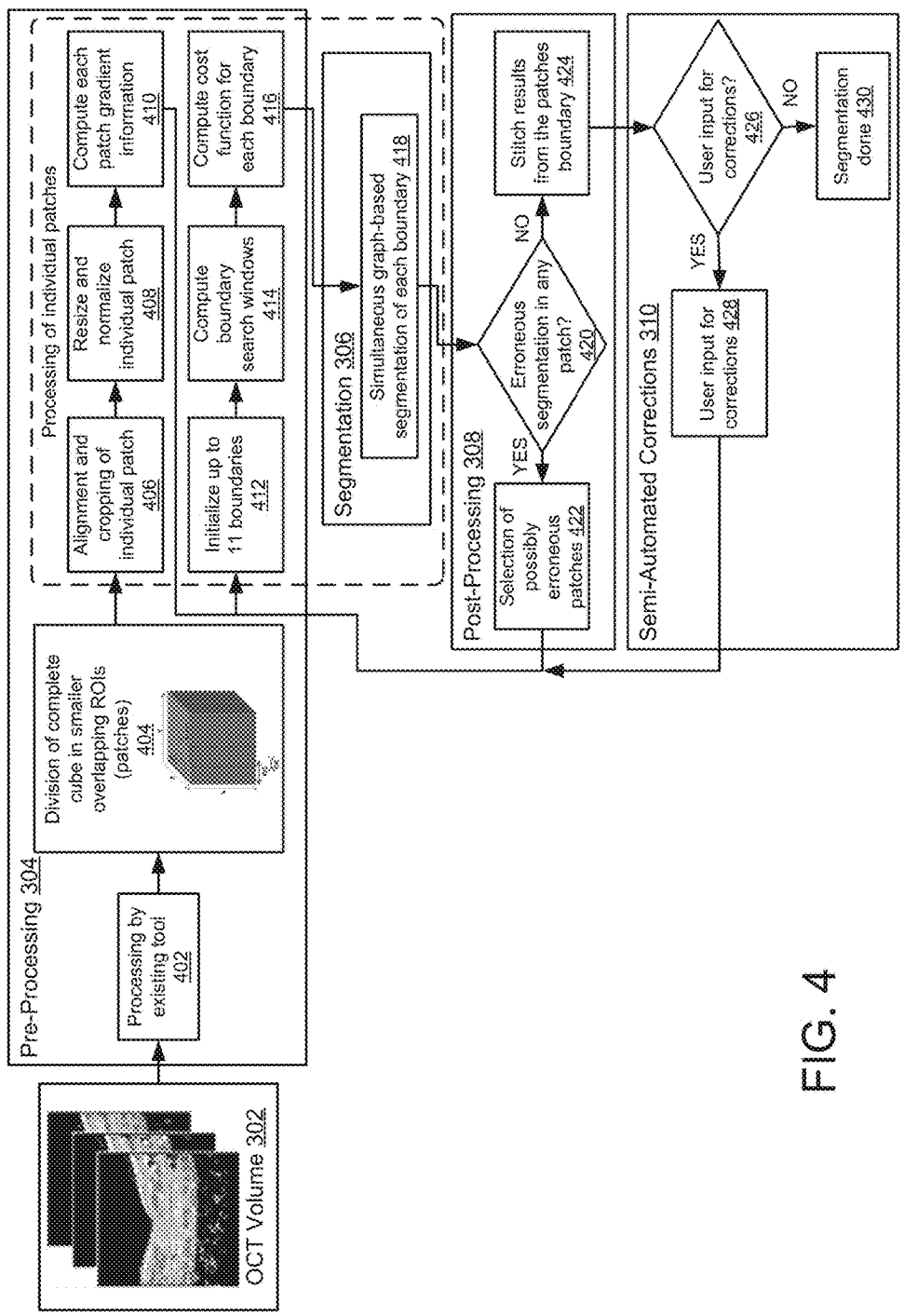
FIG. 4 specifies details in the general segmentation workflow of FIG. 3.

FIG. 4 illustrates specific operations that may be performed in each step of the segmentation workflow 300. It should be noted that same or similar reference numerals are used to refer to the steps discussed above with respect to the workflow 300 in FIG. 3. As depicted, the pre-processing step 304 of FIG. 3 includes, without limitation, step 402: processing of the OCT volume 302 by existing tools to provide some prior information about the data to be processed (for example, the location of the fovea and the ONH within the OCT volume); step 404: the division of the OCT data in volume patches of given physical size and overlap; step 406: the alignment and cropping of each individual patch; step 408: the resizing of each individual patch to a given canonical resolution and intensity properties, step 410: the computation of each patch gradient information; step 412: the initialization of up to 11 separated retinal boundaries within each patch; step 414: the computation of volumetric search windows for each given boundary and patch; and step 416: the computation of volumetric cost functions associated to each boundary and patch. The steps 402-416 are discussed in detail below with respect to sections entitled "OCT Volume Pre-processing" and "Boundary Initialization". The segmentation step 306 can be executed independently for each patch considering all the associated information computed in the previous pre-processing step 304. In some instances, each execution of the segmentation step 306 involves simultaneous graph-based segmentation of each boundary (step 418). It should be understood that the graph-based segmentation is just one exemplary approach and other segmentation approaches (e.g., machine—learning classification approaches discussed herein with respect to at least FIGS. 5 and 6) are also possible and within the scope of the present disclosure. The post-processing step 308 of FIG. 3 includes the determination of whether there are erroneous segmentations in given patches (step 420). If the result of the determination of step 420 is affirmative, then possible erroneous patches are selected (step 422) and the workflow 400 goes back to the step 412 to perform the subsequent steps as discussed above. Otherwise, segmentation results from each individual patch are stitched together over the initial span of the original OCT data (step 424). The semi-automated corrections step 310 of FIG. 3 includes the determination of whether there is a user input for corrections (step 426). If the result of the determination of step 426 is affirmative, then the user input for corrections is considered and the workflow 400 goes back to the step 412 to perform the subsequent steps as discussed above. Otherwise, the segmentation is complete and the workflow ends (step 430).

Figure 5:
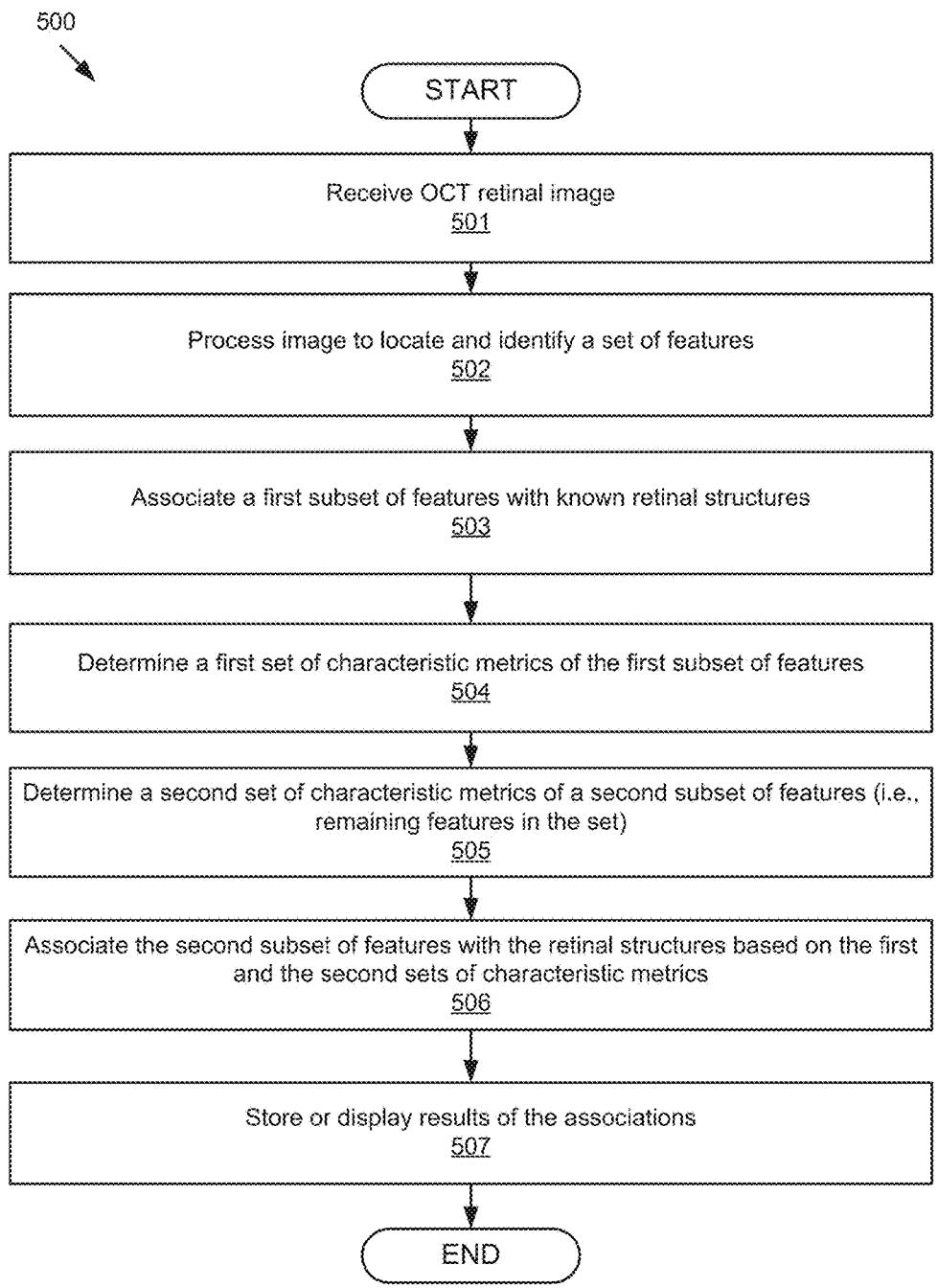
FIG. 5 is a flowchart of an example method for associating features in OCT image data with retinal structures.

FIG. 5 illustrates a generalized classification based segmentation method 500 based on features extracted from image segments of volume sub-regions or patches (obtained in preprocessing step 304 in FIG. 4). An OCT image of the retina or a patch of the OCT data is collected or received (step 501). This image or patch is processed to locate and to identify a set of features (step 502), most typically edges or sections of surfaces of retinal layers as described in further detail below with respect to section entitled "Image Processing: Identification of Features". A first subset of features is then associated with known (i.e., recognized) retinal structures (step 503). By way of an example, let's assume that the first subset includes 10 features or edges (f1-f10). Then features f1-f3 are associated with retinal structure or layer L1; features f4-f7 are associated with layer L2; and features f8-f10 are associated with layer L3. In some instances, the association of the feature(s) with a retinal structure uses minimal a priori information or prior knowledge including, but not limited to, a length, a location, a gradient class (i.e., boundary or layer changes from higher intensity (bright) to lower intensity (dark) or vice versa), continuity, parallelism, structural, and statistical properties relating to the known retinal structures. A first set of characteristic metrics of the first subset of features (step 504) and a second set of characteristic metrics of a second subset of features (i.e., remaining features in the set) are determined (step 505) (described in more detail below with respect to section entitled "Characteristic Information/Metrics" in correlation with FIGS. 10a-e). The first and the second sets of characteristic metrics are used to associate those features in the set that were not initially associated (i.e., the second subset of features) with the retinal structures based upon a probabilistic determination that a feature in question belongs to a given known or recognized structure (step 506). In some instances, this association of the second subset of features with the retinal structures is based on identification of similar characteristics metrics between the first subset of features and the second subset of features (described in more detail below with respect to sections entitled "Subspace-based Classification of Features to Retinal Structures" and "Tracking/Segment Association". Those features or segments not ultimately classifiable are likely to be associated with pathological structures. The results of the associations (i.e., the association of step 503 and association of step 506) can be stored or displayed to a user (step 507).

Figure 6A:
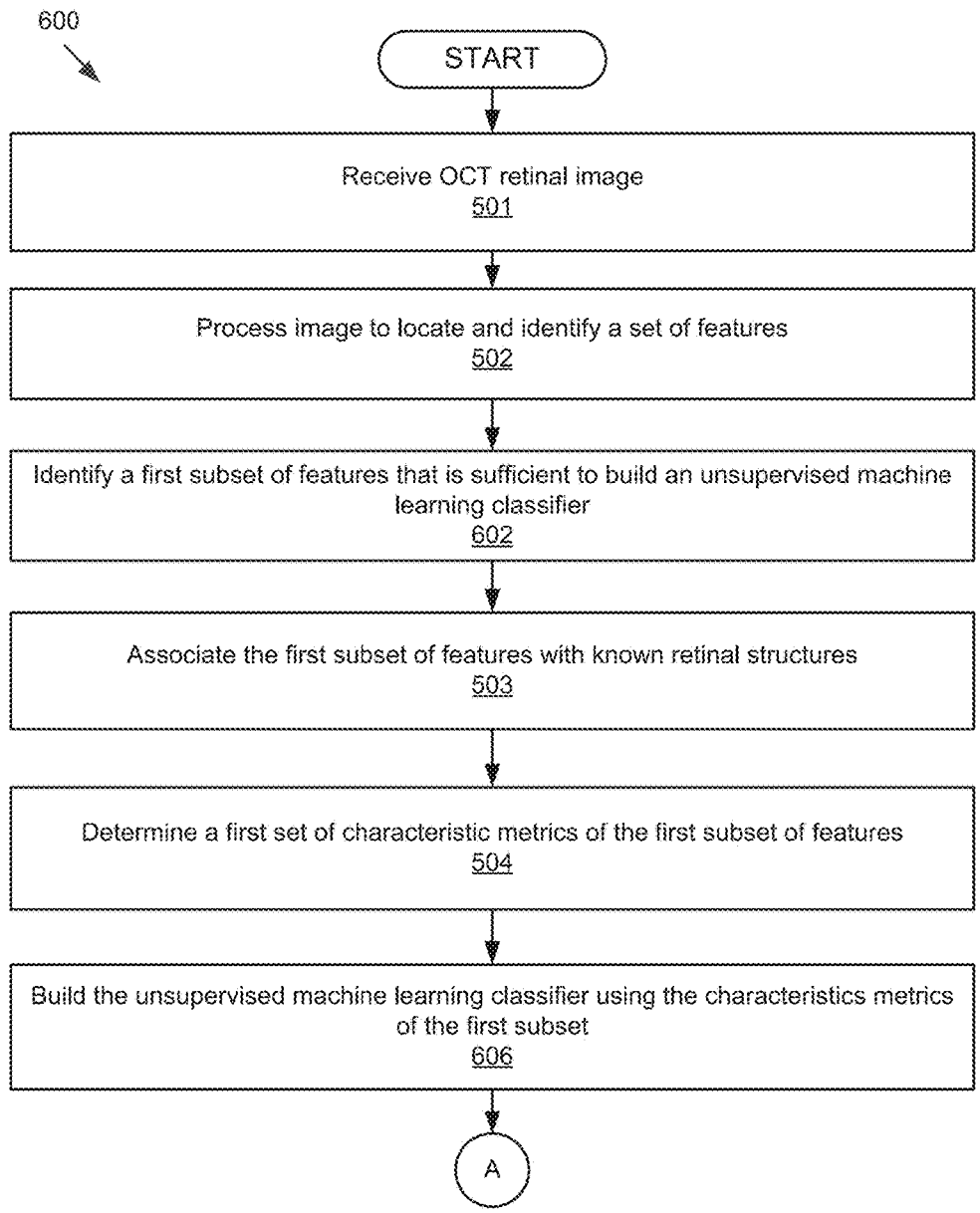
FIGS. 6a and 6b are flowcharts of another example method for associating features in OCT image data with retinal structures.
Figure 6B:
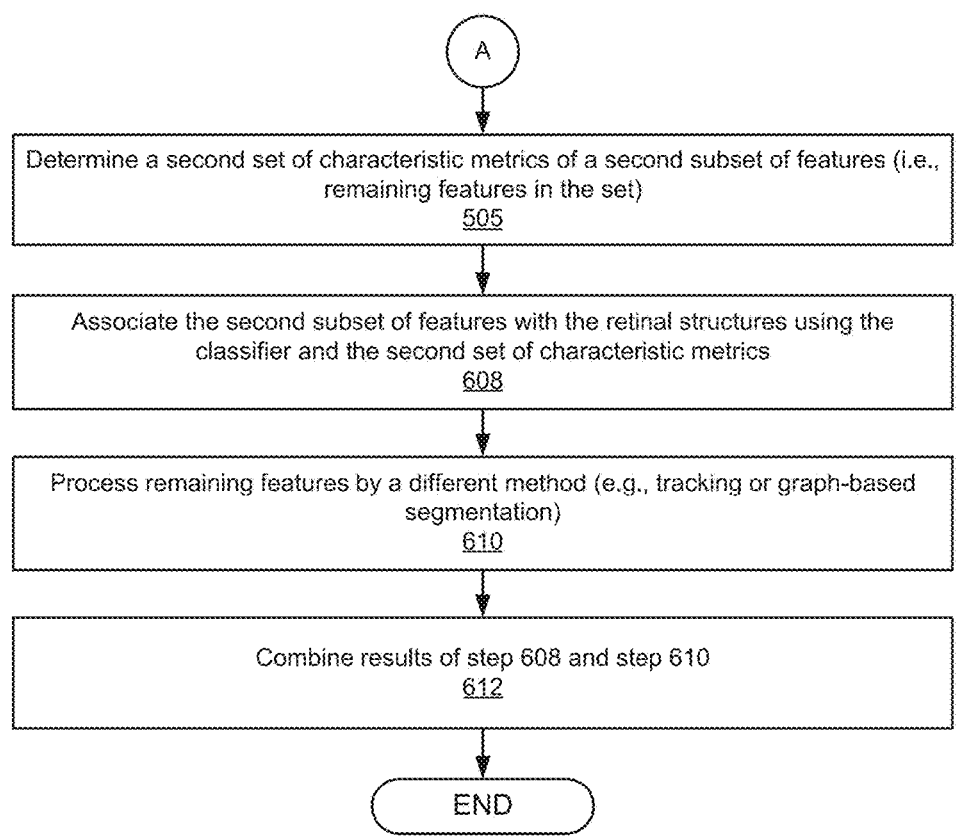

FIGS. 6a and 6b illustrate another classification based segmentation method 600. It should be noted that same or similar reference numerals are used to refer to the steps discussed above with respect to the method 500 in FIG. 5, and the description for these steps won't be repeated here. In step 602, a first subset of features is identified that is sufficient to build an unsupervised machine learning classifier. The classifier may be used to associate remaining features in the set with the retinal structures (discussed in more detail below and with respect to section entitled "Classification Systems"). The first subset of features is associated with known retinal structures (step 503) and then a first set of characteristic metrics of the associated first subset of features is determined (step 504), which is used to build the unsupervised machine learning classifier (step 606). Next, a second set of characteristic metrics is determined of a second subset of features (step 505). The features in the second subset are associated with the retinal structures using the machine learning classifier and the second set of characteristic metrics (step 608). The remaining unidentified or unknown features can be either ignored or processed by a different method (step 610). Such an alternative method could be, for example, a graph-based segmentation algorithm or a tracking algorithm (see the section entitled "Tracking/Segment Association" discussed later in the present disclosure). The results of processing in step 610 can then be combined with those derived from step 608 to form a more complete set (step 612) of segmentation results.

Figure 7A:
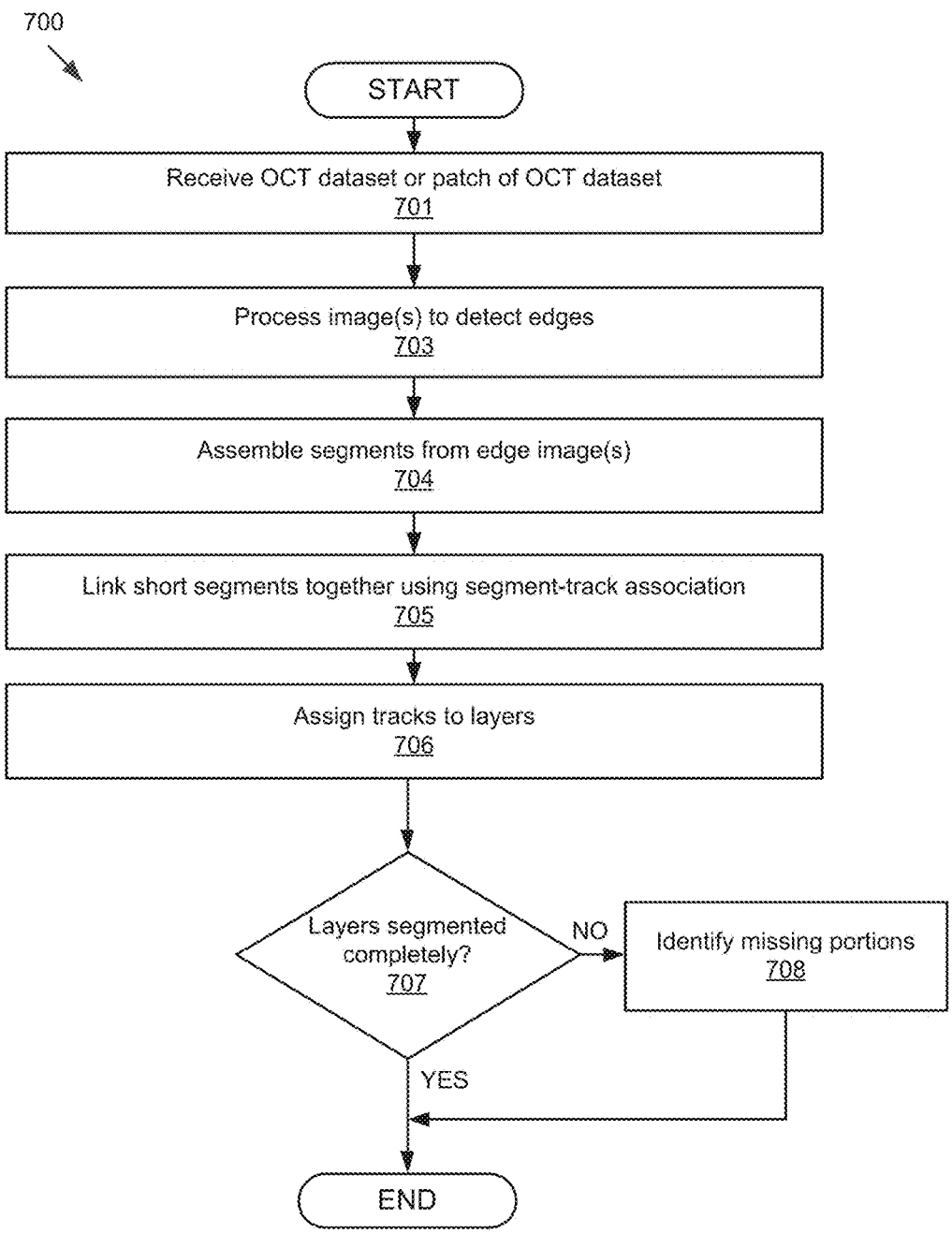
FIGS. 7a and 7b are flowcharts of two exemplary methods involving classification of segments in OCT image data.
Figure 7B:
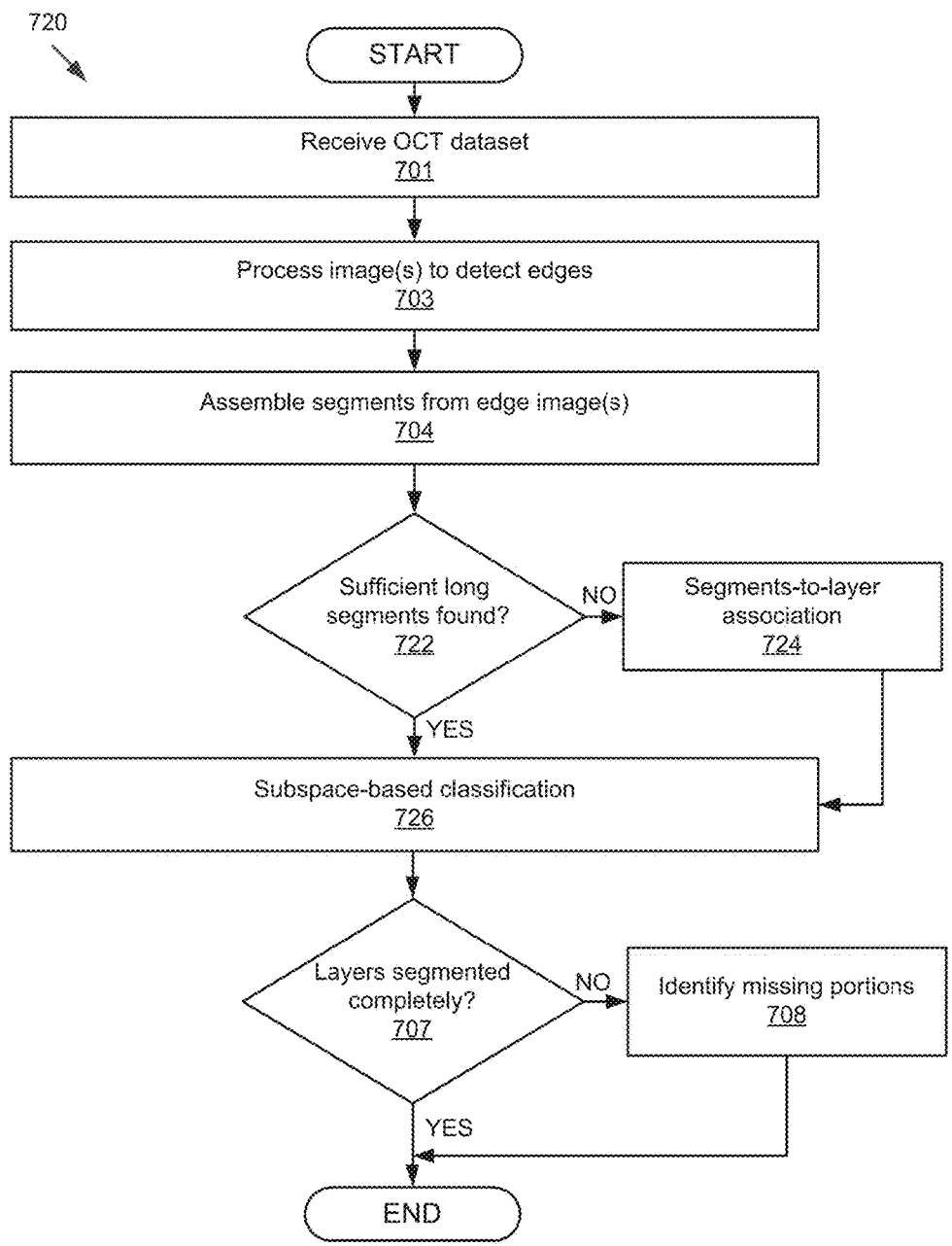

Two further embodiments of segment classification approaches are illustrated in methods 700 and 720 of FIGS. 7a and 7b, respectively. It should be noted that similar numerals are used to refer to the same steps in these methods. In both methods, an OCT dataset (including one or more patches of the OCT volume is received (step 701). In some embodiments, the OCT dataset may optionally be pre-processed to remove differential motion between scans and perform registration. The one or more images or patches are then processed to delineate features, in this case, edges (step 703). The located edges are processed to identify their connectedness i.e., whether a given detected edge can be associated with another detected edge using standard connectivity algorithms, and to identify and to form segments (step 704).

In method 700 in FIG. 7a, the next step is to link the short segments together (step 705) using track association as described in further detail below (See the section entitled "Tracking/Segment Association"). The tracks can then be assigned to layers (step 706). An evaluation can then be made as to whether all the layers have been segmented (step 707). If the layers have not been segmented completely, missing portions can be identified (step 708). Otherwise, the method 700 terminates.

Figure 8B:
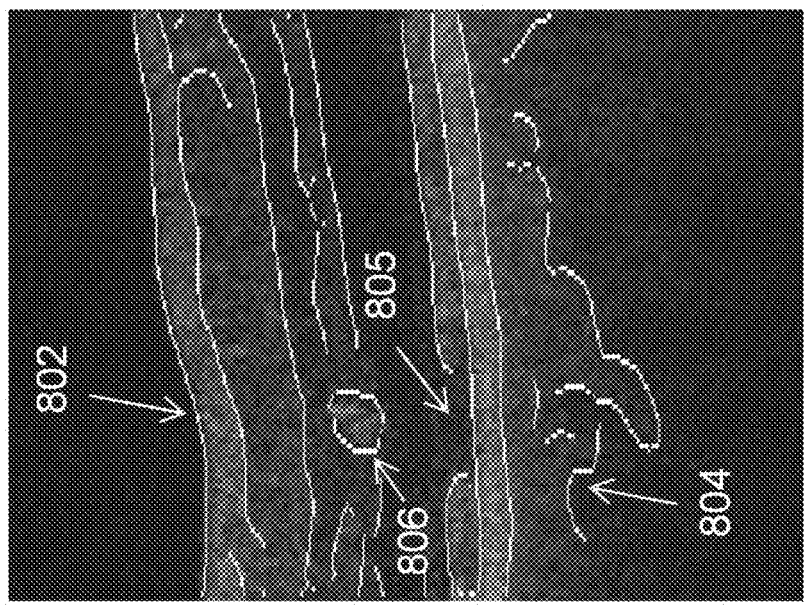
FIGS. 8a and 8b are OCT retinal scans with the detected segments overlaid thereon. In particular.
Figure 8A:
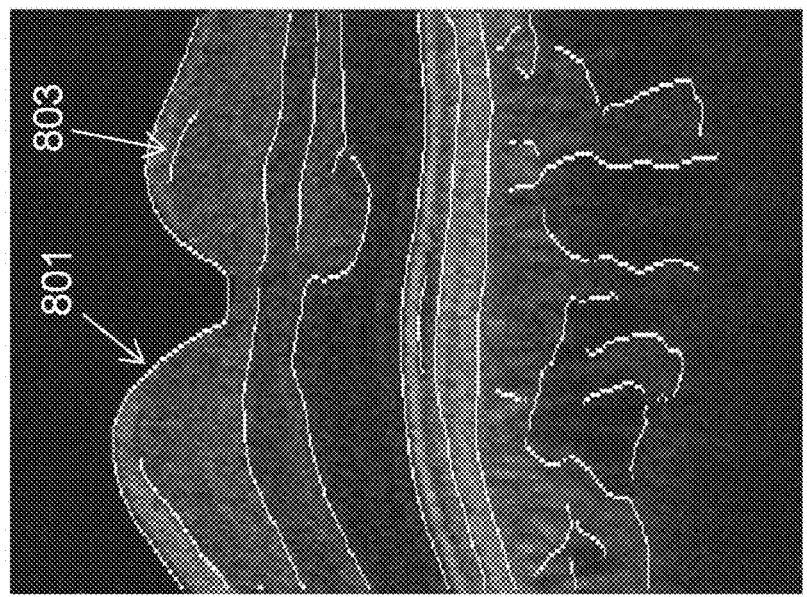

FIG. 7b shows an alternative embodiment, 720, where after the segments have been assembled (step 704), classification (e.g., subspace-based classification in step 726) is only initiated if sufficient long segments are found (step 722). In this step 722, each of the segments is examined to discern if they are a long segment (meaning longer than a value determined by the most probable retinal structure and the location of that structure) or less than this limit, in which they would be considered to be a short segment. Thus two sets of segments, short and long, depending upon length are assembled. A related alternative approach would be to create groups of segments based on similarities in their characteristic information and have large groups and small groups based on the number of segments in each group. FIGS. 8a and 8b show two OCT retinal B-scans. In particular, FIG. 8A shows an OCT retinal B-scan of a healthy eye whereas FIG. 8B shows that of a diseased eye with segments identified. In both these B-scans, 801 and 802 are examples of long segments while 803 and 804 are examples of short segments. In the diseased case shown in FIG. 8b, more disconnected segments are visible. Location 805 shows a place where the IS/OS layer boundary has a missing portion which indicates the loss of photoreceptors at that location. Edge location 806 shows a potential abnormal structure in the image data. If the number of long segments found is insufficient (decision point 722 in FIG. 7b), the next step would be to use a segment associating/linking/stitching method (step 724 in FIG. 7b). (See the section entitled "Tracking/Segment Association", given below.) If step 722 determines there are sufficient number of long segments, then a classification method (i.e., subspace based; step 726) is used to analyze the characteristic information derived from the assigned structures (See the section entitled "Subspace-based Classification of Retinal Structures", given below). In the case of long segments that are sufficiently long to be considered to be complete by a priori expectations, their characteristic information will be used to define the various subspaces of a lower dimensional space. Each subspace is associated to a retinal layer. The probabilistic association of the characteristic information of an unknown structure (e.g., short segment) with the defined subspaces will identify which subspace (or identified retinal structure) in which that short segment belongs. Thus, short segments from unidentified structures can be identified.

If the layers are completely segmented (decision point 707 in FIG. 7b), the overall procedure or method 720 is finished. If the layers or structures are inadequately segmented based upon missing segments or poor data quality along the layers, or if there are an insufficient number of long segments, then another method is used to segment the missing portions (step 708). Options for other segmentation methods include the well-known graph-based approach, or the tracking approach described below.

Additional post-processing could be performed differently for each of the segmented layers should a pathological detection be apparent (based upon the segmentation results). Examples of post-processing include smoothing, adjustment the segmented layers in advanced disease cases.

More details about the various steps of the segmentation workflow 300 (FIGS. 3 and 4), and classification methods 500, 600, 700, and 720 (FIGS. 5-7a,b) will now be described in further detail.

OCT Volume Pre-Processing:

To enable the robust processing of OCT data of various characteristics the complete data can be divided in into separate sub-volumes (referred here as "patches", see FIGS. 3 and 4) of canonical size, resolution and intensity characteristics that are later processed independently. The result of this pre-processing step also outputs a set of locations and measurements (for example, location of fovea and ONH, blood vessel maps, en-face image, gradient maps, etc.) for each patch that would later aid the rest of the segmentation process.

Figure 9B:
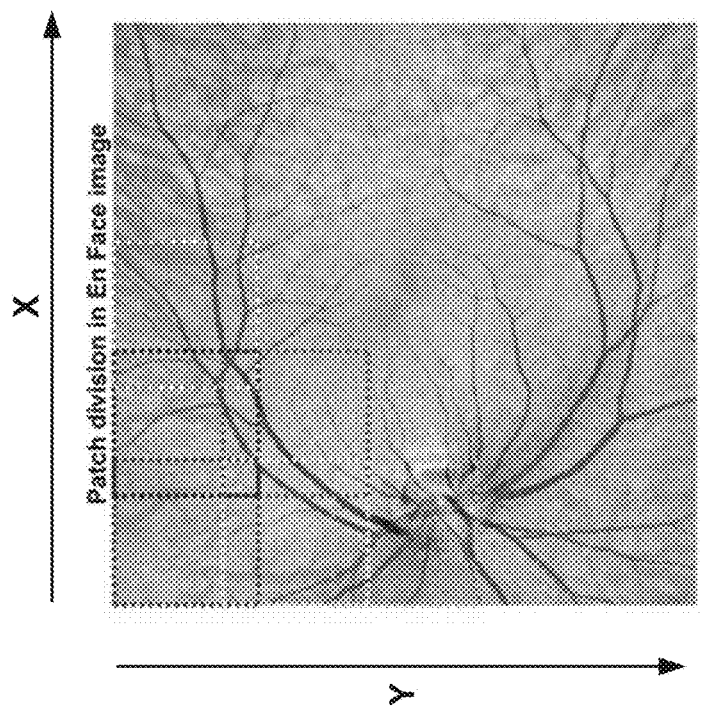
FIG. 9b illustrates the division of OCT data into patches of given size and overlap ratio in an en face view.
Figure 9A:
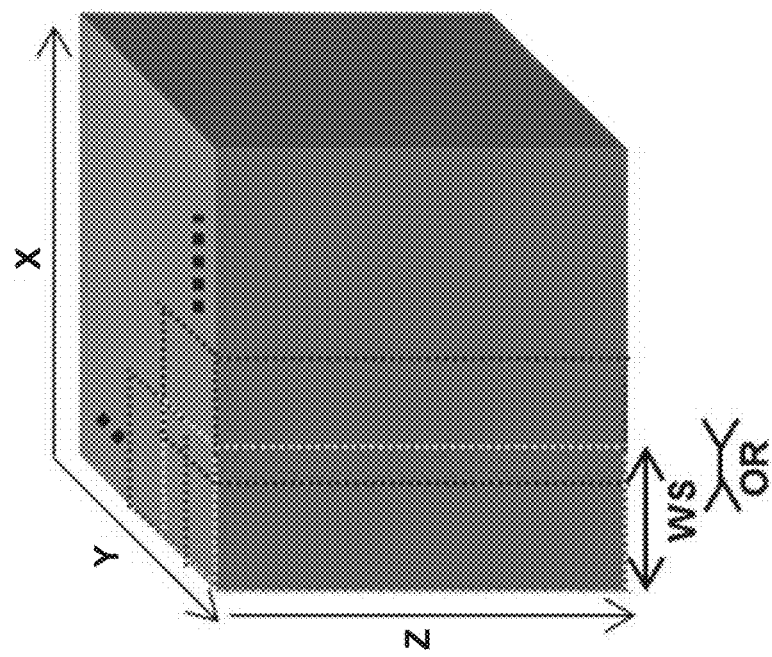
FIG. 9a illustrates the division of OCT volumetric data into sub-volumes of given size and overlap ratio.

The OCT volume pre-processing includes the division of the total or partial OCT data into patches of given span in physical dimensions and overlap between them. This process is illustrated in FIG. 9a. Given an input OCT volume, a given patch size in three dimensions (illustrated as WS for the Y direction in FIG. 9a), and a given desired overlap ratio between patches in three dimensions (illustrated as OR for the Y direction in FIG. 9a), it divides the OCT volume into the minimum number of sub-volumes of such given size so that it guarantees that there is at least the given overlap between the subvolumes. FIG. 9b illustrates the results of this division in an en-face view, where OCT data that spans 12×12 mm is divided into patches of 3×3 mm with at least a 0.2×0.2 mm overlap defined between them. It should be noted that only 6 of the possible 25 resulting patches are indicated in this illustration for simplicity purposes.

Pre-processing may also include the following:
1. Handling of the total, partial, or patches of the OCT data to align the data in the axial direction so that its centroid follows a horizontal plane (step 406 in FIG. 4). This centroid can be computed A-scan by A-scan using the intensity data within certain limits. These certain limits can be, for example, an initially estimated location for the ILM and the RPE for a given A-scan. The input of this process constitutes an OCT volume or image and the output constitutes an OCT volume or image of the same dimensions as the input data where the information of each A-scan has been shifted axially so that its computed centroid follows an horizontal plane.
2. Cropping of the total, partial, or patches of the OCT data (step 406 in FIG. 4) so its axial dimensions are limited such that they only include relevant OCT signal (those locations where retinal boundaries that we aim to delineate are located) with a small margin added for confidence in including all relevant data. This process reduces the data processed in the subsequent algorithm steps, therefore reducing computation complexity, while keeping all relevant data for the retinal boundary delineation. The input of this process constitutes an OCT volume or image and the output constitutes an OCT volume or image of reduced axial dimensions as the input data were the information of each A-scan has been cropped axially so that relevant data is kept.
3. Resizing of the total, partial, or patches of the OCT data so that it follows a canonical resolution (step 408 in FIG. 4). This step ensures that all subsets of data handled in following steps have the same properties in terms of resolution so that the algorithm is more robust and independent of the original resolution of the collected data. Resizing of the data can be done but it is not limited to a process of decimation or interpolation and may include additional techniques such as median filtering, Gaussian filtering, bilinear interpolation or bicubic interpolation. The input of this process constitutes an OCT volume or image and the output constitutes an OCT volume or image representative of the input data but with a given canonical resolution defined in the three dimensions (number of discrete observations for a given span in physical dimensions).
4. Normalization of the total, partial, or patches of the OCT data so that their intensity values follow a predetermined distribution or limits (step 408 in FIG. 4). This step ensures that intensity or illumination properties of the OCT data handled in following steps are similar so that the algorithm is robust independent of the original intensity properties of the collected data. The input of this process constitutes an OCT volume or image and the output constitutes an OCT volume or image of the same dimensions as the input data in which the intensity values have been normalized to follow a particular distribution or limits.
5. Processing of the total, partial, or patches of the OCT data to compute volumetric gradient information of the given data (step 410 in FIG. 4). This gradient information can be computed in one, two or three dimensions from the given data and the process may use one or several known techniques to compute the gradient data using derivatives or filtering (for example, a one-dimensional, two-dimensional or three-dimensional Sobel filter). The input of this process constitutes an OCT volume or image and the output constitutes a set of volumes or images describing the gradient magnitude and direction considering one, two or three directions. The three-dimensional gradient information at each individual direction in the coordinate axes may also be computed.
6. Processing of the total or partial OCT data to generate the following:
    a. an en-face two-dimensional image representing the projection of intensities along the axial direction;
    b. a "segmentability map" two-dimensional image representing the projection of axial gradients along the axial direction;
    c. the automated localization of the fovea and/or ONH coordinate centers within the OCT data;
    d. a two-dimensional vessel segmentation image consisting of a map indicating the positions of blood vessels within the given OCT data; and
    e. an initial estimation of the location of the ILM and RPE boundaries within the OCT data using previously known algorithms.

Image Processing: Identification of Features

To enable the identification of features within the image data (such as in steps 502 (FIG. 5) and 703 (FIG. 7)), edge detection is performed on the B-scan image or its reduced-size version. This procedure ultimately results in an edge image where a pixel having a value "1" represents an edge (see for example, Canny, John. "A computational approach to edge detection." *IEEE Transactions on pattern analysis and machine intelligence* 6 (1986): 679-698). A gradient image is converted into an edge image by applying a threshold. Any pixel value greater or equal to a pre-defined value is given the value of "1". Any pixel value not satisfying this requirement is given the value of "0". The skilled person in the art will readily recognize that determining threshold values is a standard art (see for example, Parker, Jim R. *Algorithms for image processing and computer vision*. John Wiley & Sons, 2010).

While the Canny edge detection method is the preferred algorithm, other approaches, with subsequent pixel thresholding/binarization, would be tractable as well. The Canny algorithm converts the initial intensity image into a gradient image by the use of some derivative function such as that of a derivative Gaussian. Canny edge detection produces an edge image that contains most likely all the desired retinal structure edges or layer candidates, such as those from the retinal layers and any retinal pathologies that may be present.

Besides the use of this functional characterization, optional functional forms that could be convolved with the intensity data in the axial dimension to create a gradient image are Prewitt or Sobel operators, Laplacian, Kirsch compass, Marr-Hildreth, difference of Gaussians, Laplacian of Gaussians, higher-order Gaussian derivatives, Roberts cross, Scharr operator, Ricker wavelet, Frei-Chen or any discrete differentiation operator well known to the ordinary skilled person in the art.

Additional approaches can use multi-scale techniques such as Log-Gabor wavelets and phase congruency (see for example, Kovesi, Peter. "Phase congruency detects corners and edges." The Australian pattern recognition society conference: DICTA 2003, 309-318) to generate gradient images and extract image features to aid in the identification of features within the image. Phase congruency is highly localized and invariant to image contrast which leads to reliable image feature detection under varying contrast and scale. The method of phase congruency is applicable to features with small derivatives, low gradients, or low contrast features, or smooth steps where other methods have failed.

Within the edge image, there are gaps between neighboring short segments (which consist of several adjacent edge pixels). These gaps can be connected by searching at the end of such a segment, within a specified radius, to locate any points, or other segment endpoints that lie within said radius. Should multiple points be found within a radius, the additional information such as using a predictor-corrector method, or a low-order polynomial fit, should aid in identifying the correct point. Additional information and techniques for associating, connecting, linking, stitching, or following segments are outlined in the section entitled "Tracking/Segment Association" discussed later in the present disclosure.

By this approach, short segments can then be assembled into long segments. If the length of a combination of short segments exceeds a predetermined minimum, it is classified as a long segment. Such a predetermined minimum could be based upon what is expected based on the scan pattern used, and the characteristics of the optical train delivering the probe beam to the retina, such as the field-of-view (FOV).

Short segments that cannot be connected with other segments to form long segments can be placed into a holding area until they can be further analyzed and compared with the properties (characteristic information) of long segments.

Characteristic Information/Metrics

Some of the criteria used in the classification of the features (connected edges, short or long segments), are statistical in nature. Such statistical metrics could include dispersion/variance and/or moments such as mode, mean, median, skewness, kurtosis, of distributions of pixel values in selected sub-images of the data. Other statistical analyses to identify a region or sub-image with an excess of intensities above the background would be readily apparent to the skilled person in the art. The regions to obtain such statistics are just above, at the edge, and just below the edge in question. These statistics or statistical metrics can be combined into one or more metrics that can be used in associating segments with layers or other retinal structures. Geometric metrics of the edge or segment, such as curvature and its variations could be used in conjunction with statistical metrics for normal cases or a specific disease case with known structural changes. In general, geometric metrics are not invariant to a wide variety of disease cases.

Figure 10A:
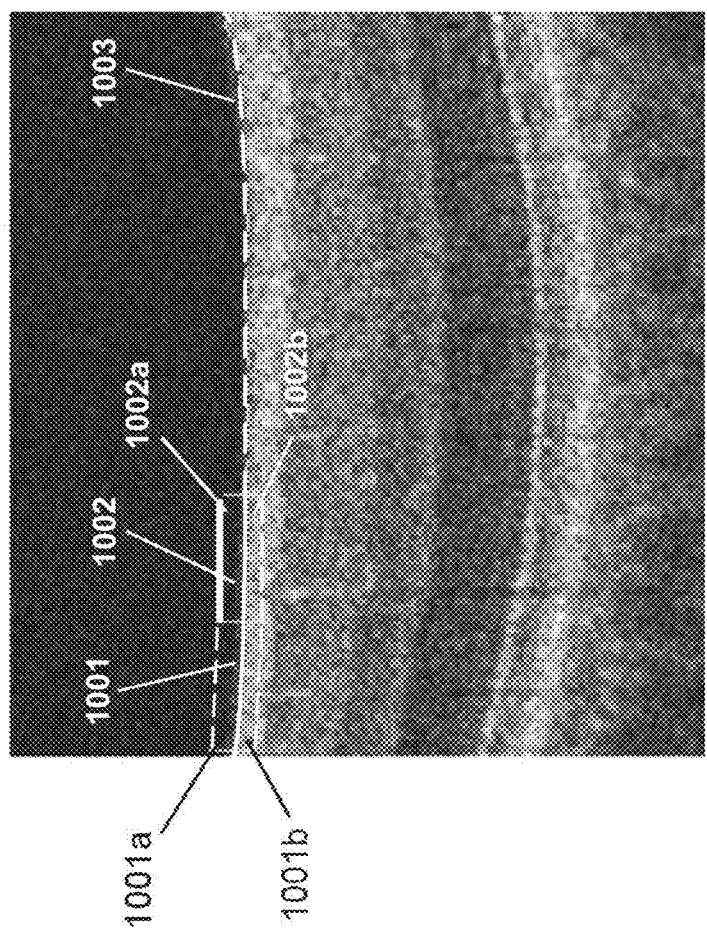
FIG. 10a is an OCT image of the retina in which two segments have been defined on the inner limiting membrane (ILM). The two segments are encased in sub-regions to define where statistical analyses will occur.

FIG. 10a depicts one approach to determining characteristic metrics for features in an OCT retinal B-scan. Two identified segments 1001 and 1002 about the ILM 1003 have been selected, each being surrounded by a dashed boxed region. From these regions, upper and lower sub-regions 1001*a*, 1001*b*, 1002*a*, and 1002*b* are defined. The shape of the sub-regions is dependent upon the shape or curvature of the segment or partition under investigation. Typically the length of the sub-region is between 200 and 750 microns. The height of the sub-region above or below the layer in question can be from 10 to 40 microns, with 20 microns being preferable. These limits have been chosen to provide enough of an area that reliable statistics can be derived from the gray-scale or intensity image. It is the criteria of reliable statistics that drive the areal coverage.

Figure 10C:
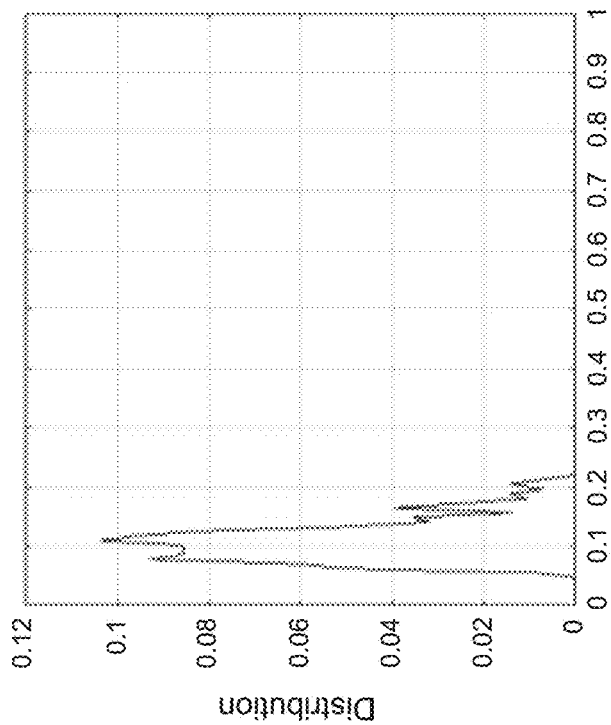
Figure 10B:
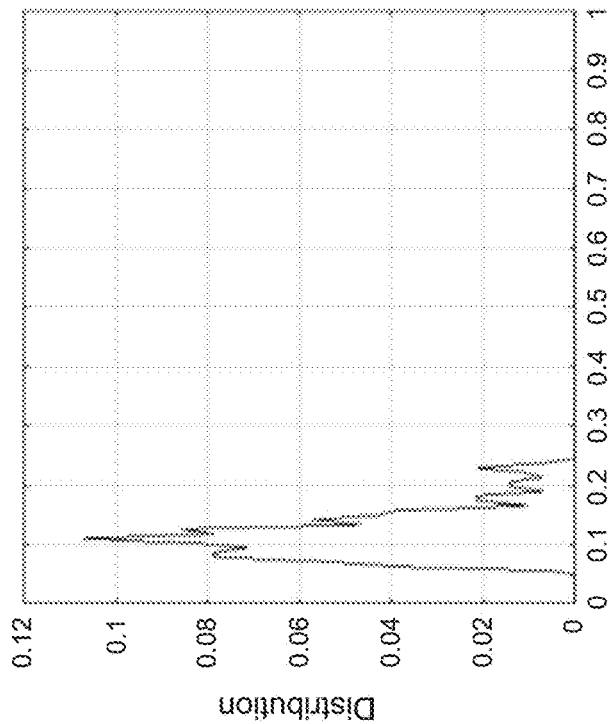
Figure 10E:
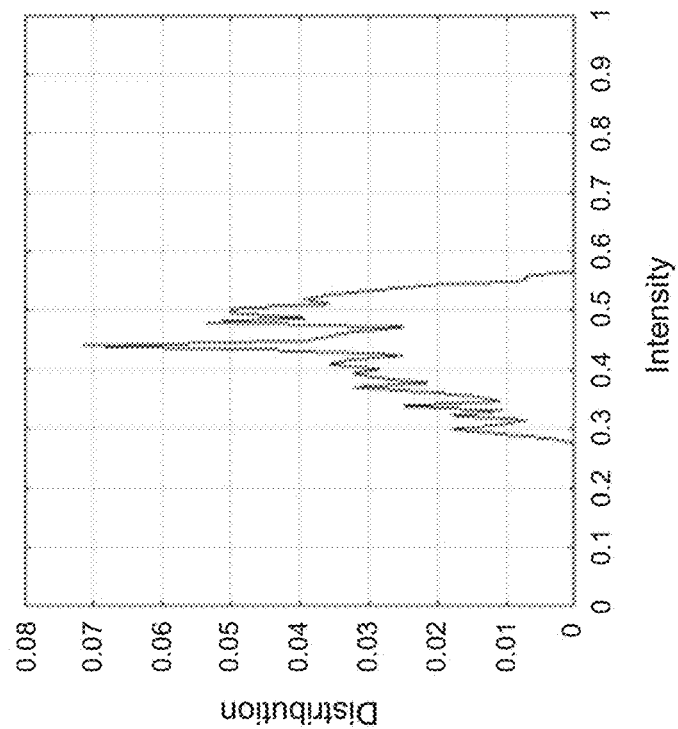
Figure 10D:
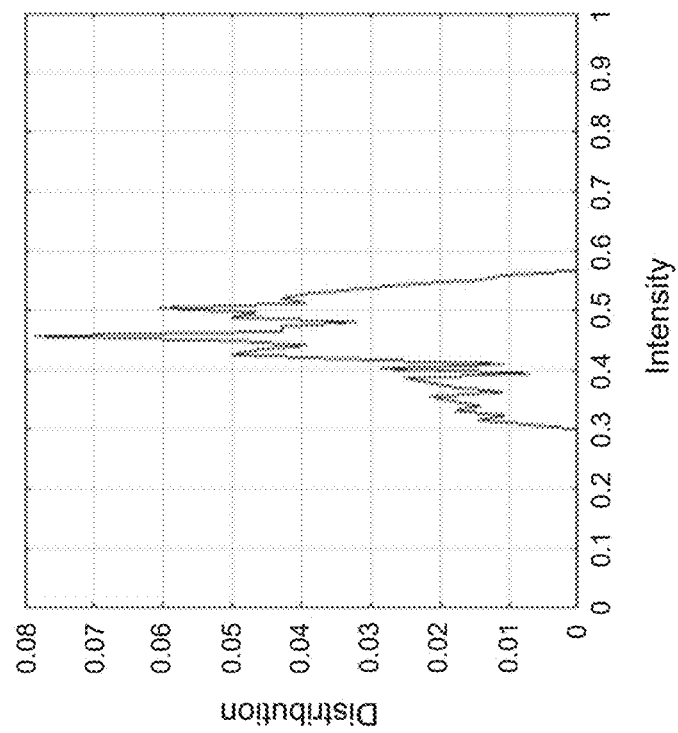

For each of the four sub-regions statistics are obtained. Probability distribution functions (pdf) for each sub-region can be determined. FIG. 10b shows the pdf for the sub-region 1001*a*. FIG. 10c shows the pdf for sub-region 1002*a*. FIG. 10d shows the pdf for sub-region 1001*b* and FIG. 10e shows the pdf for sub-region 1002*b*. Analyses of a pdf can be carried out in a variety of ways, as enumerated above. The results of the analyses are scalar quantities which will then be some of the components of a feature vector, the nature of which will be described below. In some instances, two feature vectors can be defined: $v_1$ based on the pdfs for 1001*a* and 1001*b*, and $v_2$ based on the pdfs for 1002*a* and 1002*b* (In these particular vectors, the scalar components implied therein are for illustrative purposes only).

The information collected on and about the various edges is called characteristic information or metrics. In addition to the previously mentioned statistical properties (or a subset or reduced version of these statistical properties) both on and about the detected edges, other useful information includes: gradient class, relative z-positions, expectation of continuity and parallelism in certain cases (such as retinal layers). Some of this information has, as a basis, a priori knowledge (i.e., prior knowledge or criteria) of what is expected in a broad or general sense based upon the extensive amount of data available in the literature and available online.

Gradient class defines whether a gradient is positive or negative. Positive gradient class category is defined (as z-increases) as the detected intensity being higher on the larger-z at the edge than at the smaller-z of that edge. Negative gradient class is just the opposite. As certain retinal layers consistently exhibit such behavior, this information can be used as an initial, crude assignment—part of the prior knowledge that is used. The positive gradient class (dark to bright) will include the boundary between the vitreous and the ILM, the upper boundary of the bright line associated with the IS/OS, and the upper boundary of the bright line associated with the OPL. The negative gradient class (bright to dark) will include the boundary between the IPL and the INL, the outer boundary of the RNFL, the outer boundary of the OPL and the outer boundary of BM. Some layers are known to have directional reflectivity, which means that their gradient class may vary depending on pupil entry point and the angle of incidence of the light on the tissue. One example of such a layer is the Henle's Fiber Layer that forms part of the OPL (see for example, Lujan, Brandon J., et al. "Revealing Henle's fiber layer using spectral domain optical coherence tomography." Investigative ophthalmology & visual science 52.3 (2011): 1486-1492.).

Classification Systems

In pattern recognition and machine learning, a feature vector is an n-dimensional vector of numerical metrics that represent some object. Many algorithms in machine learning require a numerical representation of objects, since such representations facilitate processing and statistical analysis. When representing images, the feature vector components might correspond to the pixels of an image or perhaps measures or metrics that have been determined from one or more images.

Feature vectors are equivalent to the vectors of explanatory variables used in statistical procedures such as linear regression. Feature vectors are often combined with weights using a dot product in order to construct a linear predictor function that is used to determine a score for making a prediction. The vector space associated with these vectors is often called the feature space. In order to reduce the dimensionality of the feature space (a hyperspace), a number of dimensionality reduction techniques can be employed, so as to ease the computational requirements.

Subspace methods of pattern recognition are based on the hypothesis that individual classes (such as retinal structures) lie in different vector subspaces of the overall hyperspace. Once the projection of the hyperspace onto a subspace for each class is determined, a pattern is assigned to a class based on its distance from the different vector subspaces.

For each input vector to be classified, vector subspaces are formed for each class by identifying patterns from that class which are close to the input pattern. This is essentially a nearest-neighbor technique.

Classification of patterns often follow one of two paths: unsupervised and supervised. The latter is the situation where training data are used to establish classes. Thus an input (a scalar or a feature vector) to such a classifier uses these data to identify where the input lies in the established classification scheme. On the other hand, unsupervised classification is to establish some sort of underlying relationships or hidden structure, thus no training data are required.

The approach in the present situation, where no external training data are used, is to use the information contained within an OCT image itself to identify known retinal structures and associate some features (e.g., edges, segments) with these structures based on minimal prior knowledge, and to use statistical measures and other metrics of these features to aid in associating other or remaining features with the retinal structures or retinal layers. The characteristics of the features will congregate in certain localized volumes of a large hyperspace defined by ensemble of components. Thus within each image, enough information is derived so that the classifier for that image is self-learning. Such an approach obviates the need for obtaining training data from clinical studies as well as the large amount of manual labor that goes into interpreting and ramifying the information derived from said clinical studies.

Subspace-Based Classification of Features to Retinal Structures

The basic goal is to assign each identified feature (e.g. segment) to a physical structure (e.g., a retinal layer, layer boundary, or a non-layer structure, such as an anatomical anomaly). The assumption is that the characteristic metrics such as the statistical properties of each feature (at a particular location), and the boundaries about each structure (e.g., retinal layer) can be modeled. Each model can be represented by a subspace spanned by a few eigenvectors, which are determined by analyses of the same set of statistical properties on the set of long segments. The method is first to assign segments of sufficient length to known retinal structures, based upon minimal a priori information. Upon establishing the properties of subspaces defined by the known structures, the remaining segments (e.g., short segments) can be classified and assigned to the retinal structures.

Upon determining these and other statistical metrics, along with other information that makes up the characteristic information or metrics, an example of a feature vector for segment 1001 delimited by sub-regions 1001a and 1001b may be defined as follows:

$$v=v(x,y,z,\text{mean}(1001a),\text{variance}(1001a),\text{median}(1001a),\text{mode}(1001a),\text{mean}(1001b),\text{variance}(1001b),\text{median}(1001b),\text{corr}[\text{pdf}(1001a),\text{pdf}(1001b)],\text{intersect}[\text{pdf}(1001a),\text{pdf}(1001b)],\text{dist}[\text{pdf}(1001a),\text{pdf}(1001b)]),$$

where x,y,z are the canonical Euclidian axes defined within an image; mean (1001a) is the mean (average) of the values in sub-region 1001a; corr[pdf(1001a), pdf(1001b)] is the correlation between the probability distribution function (=pdf) of 1001a with that of 1001b; intersect[pdf(1001a), pdf(1001b)] is intersection between the relevant pdfs; and, dist[pdf(1001a), pdf(1001b)] is the Bhattacharyya distance between those pdfs, which measures the similarity between two probability distribution functions (see for example, Cha 2007, 'Comprehensive Survey on Distance/Similarity Measures between Probability Density Functions,' Int J Math Models Meth App Sci 1, 300-307). While this definition is specific, it includes only a few of the possible components that are possible in creating a feature vector.

Other components that could be included in the feature vector are geometric metrics, such as curvature, or average curvature, and a variance of the curvature. Short segments of steep curvature are likely to be derived from pathological conditions rather than the paths followed by retinal layers, although not universally. One example is the large vessels of the choroid, which may yield steep segments because of the gradient between the pigmented choroidal tissue and the lumens of the choroidal vessels which are dark because of the rapidly moving blood within them.

Deriving a feature vector for each segment, or preferably for each partition (sub-segment) of a segment, allows construction of a matrix of these feature vectors, from which eigenvectors/eigenvalues can be derived. The eigenvectors will represent those axes where the principal components lie. While the dimensionality of such a matrix is large, several of the vector components are likely to be correlated and thus a smaller dimensionality (a subspace) should be sufficient to identify the location within that subspace where a given retinal structure at a given location will lie. Thus individual retinal structures or layers or specific anatomical pathologies will each have its own identifiable subspace(s). One of the distinct advantages of this subspace approach is that it is fast, thus well-suited to automated learning. In addition, this subspace approach does not have any parameter to be optimized off-line by extensive experiments or cross-validation which may require a machine learning expert.

Figure 11A:
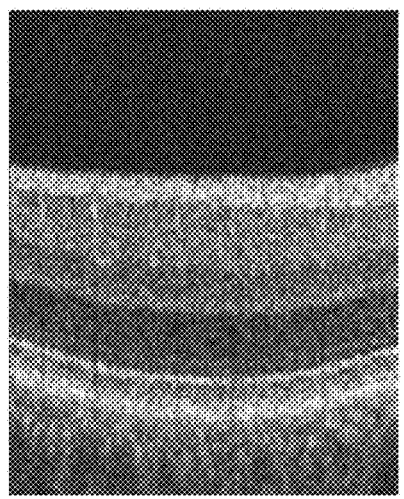
FIGS. 11a to 11d show a collection of OCT retinal B-scans. Specifically.
Figure 11B:
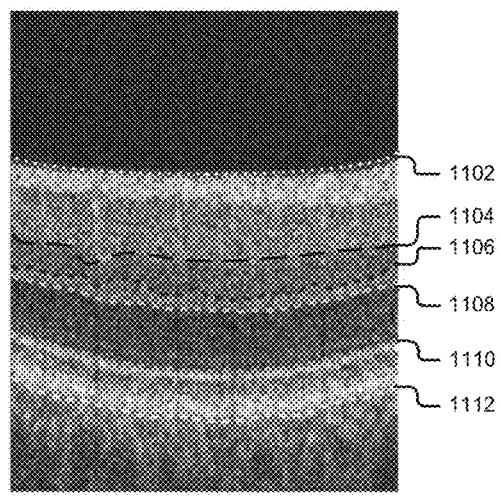
Figure 11C:
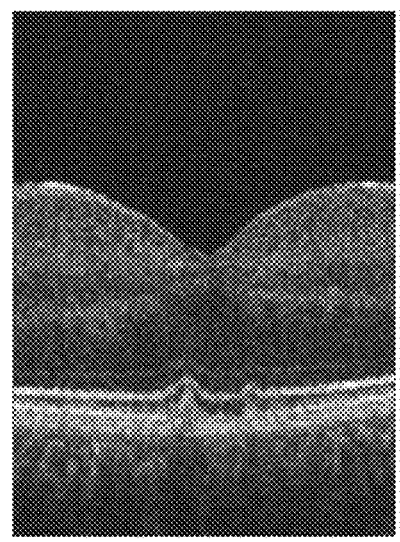
Figure 11D:
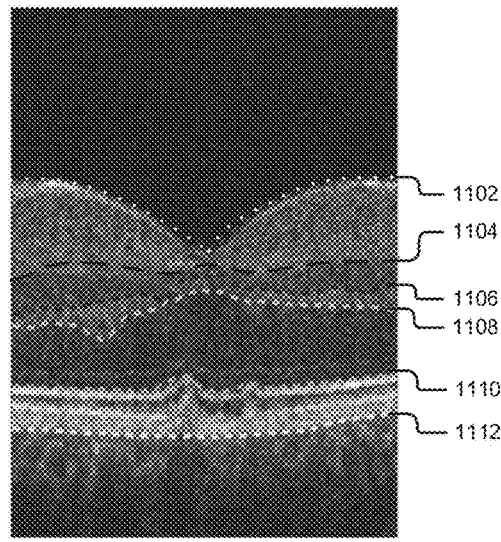

FIGS. 11a-d show segmentation results of OCT B-scans based upon the segmentation and classification approaches described herein. FIG. 11a shows a B-scan for a healthy retina while FIG. 11c shows a B-scan of an unhealthy eye. FIGS. 11b and 11d show the segmentation of the B-scan illustrated in FIGS. 11a and 11c, respectively. In each of the segmentation in FIG. 11b and FIG. 11d, the ILM (1102), IPL (1104), INL (1106), OPL (1108), IS (1110), and BM (1112) layer boundaries are identified. The segmentations are achieved with the various segmentation and/or classification approaches disclosed herein. Thus, these approaches are capable of segmenting multiple retinal layers simultaneously. In addition, they are applicable to structures or structures created by pathological conditions, such as drusen, geographic atrophy, exudates, pigment epithelial detachment, epiretinal membranes, microaneurysms, and anything that causes a structural departure from what is considered to be a normal or healthy retina.

Automated Learning Based on Long Segments

Long segments that exceed a certain length can be considered to contain sufficient characterizing information as to be useful in establishing a method by which unidentified short segments can be identified. A first step in the classification approach, is to partition the long segments and derive characteristic information about each partition. Statistical properties (i.e., characteristic information) around each partition provide a plurality of components of a feature vector. The feature vectors for a given retinal portion are assumed to populate a particular subspace of the hyperspace defined by the totality of multi-component feature vectors. The distances between the subspaces are sufficiently large thus segregation between subspaces is practical.

Classification of Short Segments

In order to classify short segments, they can also be divided into partitions. These partitions, like those of the long segments, can also be represented by similarly constructed feature vectors. A particular partition, based upon its feature vector, will be assigned to a subspace (e.g. a retinal layer) if the distance from its feature vector to a subspace is the shortest one possible. The distance is defined in the usual way by Euclidian distance between the feature vector and its projection onto a subspace. If there is no clear discrimination as to which subspace that feature vector is associated, then that partition will be rejected.

Tracking/Segment Association

In the classification of segments approach discussed in FIG. 7a, an option for processing unidentifiable segments is that of tracking or segment-track association (step 705), which is in the sense of following a target. In other words, predicting where a target is likely to be in one part of an image, given its behavior in another part of that same image.

The objective of the tracking/segment association is to process an image of a retina by 1) locating the edges within the image; 2) assembling the edges into one or more segments; and 3) linking the segments together to form at least an identifiable portion of one or more retinal structures. The segments are linked based upon their descriptors (characteristic information), including, but not limited to, similar statistical properties under and about the segments (or partitions thereof), and the belief that a subset of the discovered segments are relatable by a known Markovian association (e.g., retinal layers or retinal structures) and thus are ultimately connectable. Thus the task is to identify segments with common characteristics, and then to link or stitch them together into an identifiable retinal structure.

Comparisons or data associations are usually approached by two different probabilistic methods: 1) Bayesian—which computes a full (or approximate) distribution from priors, posterior beliefs, and observations; and, 2) non-Bayesian—which computes a maximum likelihood estimate from the possible set of solutions.

This tracking/segment association method is referred to in the literature as track stitching/linking within the multi-target tracking framework (a track is a virtual trajectory or path. In the present case, it is a potential layer, which ideally will be associated with an actual retinal layer or structure).

To deal with the track stitching/linking problem, techniques such as Multiple Hypothesis Tracking (MHT) are often used, which involves associating small segments to tracks (see for example, Singh, V. K., Wu, B., & Nevatia, R. (2008, January). Pedestrian tracking by associating tracklets using detection residuals. In Motion and video *Computing, 2008. WMVC 2008. IEEE Workshop on* (pp. 1-8). IEEE; and Amditis et al. 2012 'Multiple Hypothesis Tracking Implementation' in Laser Scanning Technology ed. By J. Apolinar Munoz Rodriguez). MHT considers the associations of sequences of measurements with tracks and false alarms, and evaluates the probability of association hypotheses that can be considered as an optimal Bayesian solution. Additional multi-target tracking approaches are disclosed in Nillius, Peter, Josephine Sullivan, and Stefan Carlsson. "Multi-target tracking-linking identities using bayesian network inference." In 2006 *IEEE Computer Society Conference on Computer Vision and Pattern Recognition (CVPR'06)*, vol. 2, pp. 2187-2194. IEEE, 2006; and Salvi, Dhaval, et al. "A graph-based algorithm for multi-target tracking with occlusion." *Applications of Computer Vision (WACV)*, 2013 *IEEE Workshop on*. IEEE, 2013.

For instance, in radar tracking, MHT allows a track to be updated by more than one detection (representing range and bearing of a target) at each radar update, spawning multiple possible tracks. As each radar update is received, every possible track can be potentially updated with every new update. Over time, the track branches into many possible directions. The MHT calculates the probability of each potential track and typically only reports the most probable of all the tracks. For reasons of finite computer memory and computational power, the MHT typically includes some approach for deleting the most unlikely potential track updates. MHT is designed for situations in which the target motion model is very unpredictable, as all potential track updates are considered.

In multilayer segmentation, the association between each segment and its potential associates (or continuations) is based upon pairwise association likelihoods. To achieve this, a track is initiated at each segment found. For each segment, in order to simultaneously find all the associations between a given segment and its potential associates, a MHT algorithm is used. MHT maintains multiple hypotheses for each target path and eventually selects the best path (most statistically likely) as the potential layer segmentation.

An example of pairwise association likelihood between two segments, i and j, can be defined as conditional independence of likelihood of segments.

$$P(S_i, S_j) = P_b(S_i, S_j) P_s(S_i, S_j)$$

where $S_i$ and $S_j$ represent segment i and j respectively.

$$P_b(S_i, S_j)$$

is a binary function which equals to 1 if $S_i$ ends before $S_j$ starts. The similarity association likelihood $$P_s(S_i, S_j)$$

can use the weighted Bhattacharya distance between the segment statistics models:

$$P_s(S_i, S_j) = e^{-k \times d(M_i, M_j)},$$

where $d(M_i, M_j)$ is the distance (e.g., Bhattacharya) measurement between models for segment i and j.

An alternative data association approach is Hungarian algorithm (Kuhn-Munkres algorithm) by forming an association cost matrix using the pairwise association likelihoods and computing the optimal association (maximizing joint likelihood). This algorithm is common in assigning tasks to individual workers, each with a cost associated with that worker performing a particular task.

Boundary Initialization:

A boundary initialization step (e.g., step 412 in FIG. 4) provides a first estimation of the location of each retinal layer within the total OCT data or patches of the data. A first initialization of the retinal boundaries may employ: 1) the OCT data intensity and gradient properties, 2) the features obtained from small connected sub-regions in the OCT data, 3) the connectivity between these small sub-regions within each other, and 4) common known properties that should be common for every eye (for example, such that retinal boundaries should not cross each other).

An initial estimation can be generated by analyzing the gradient profiles in the OCT data A-scan by A-scan and associating large axial gradient magnitudes to a set of boundaries given a set of rules. For example, the ILM may be estimated by finding the first positive gradient location of significant high magnitude along the A-scan, as the ILM always present the first largest transition of dark-to-bright pixels along each A-scan. Subsequent layers may be estimated by analyzing the number of transitions observed in the A-scan along with their gradient sign and set of order of appearance and association rules that are defined a priori. By associating locations in each A-scan to a particular set of retinal layers, an initial estimation for each layer can be generated in the form of segments by considering all A-scans within a B-scan, or in the form of surfaces by considering all A-scans within a OCT volume. The gradient information may be previously filtered to remove possible noise, either using non-adaptive techniques, or techniques that adapt to the information in the OCT data, such as the distance measured between a first identification of the ILM and the RPE boundaries for each particular A-scan. Different filtering techniques may be used, for example, Gaussian filtering, polynomial filtering, or Savitzky—Golay filtering.

The initial estimation based in the gradient information and given rules can be later readjusted by a series of refinement steps. These refinement steps can include the division of each initially labeled segment or surface to a set of smaller connected separated sub-segments or sub-surfaces of given size (depending if we are analyzing 2D or 3D OCT data) and the later re-labeling of the collection of these for all the retinal layers considered. This relabeling can be done by analyzing the 2D or 3D connectivity of the collection of sub-segments or sub-surfaces independently of their initial layer labeling, generating the set of different possibilities of fully connected sub-segments or sub-surfaces, and relabeling each retinal layer to their most likely connected possibility. This likelihood can be based in their position in space and interaction between them and a set of given rules. Sub-segments or sub-surfaces that were initially identified but do not form part of any of the labeled layers can be then later be evaluated and possibly assigned to a labeled layer by analyzing their features and distance to a subspace defined by the sub-segments or sub-surfaces assigned to a given layer, in a similar process as described earlier.

Figure 12:
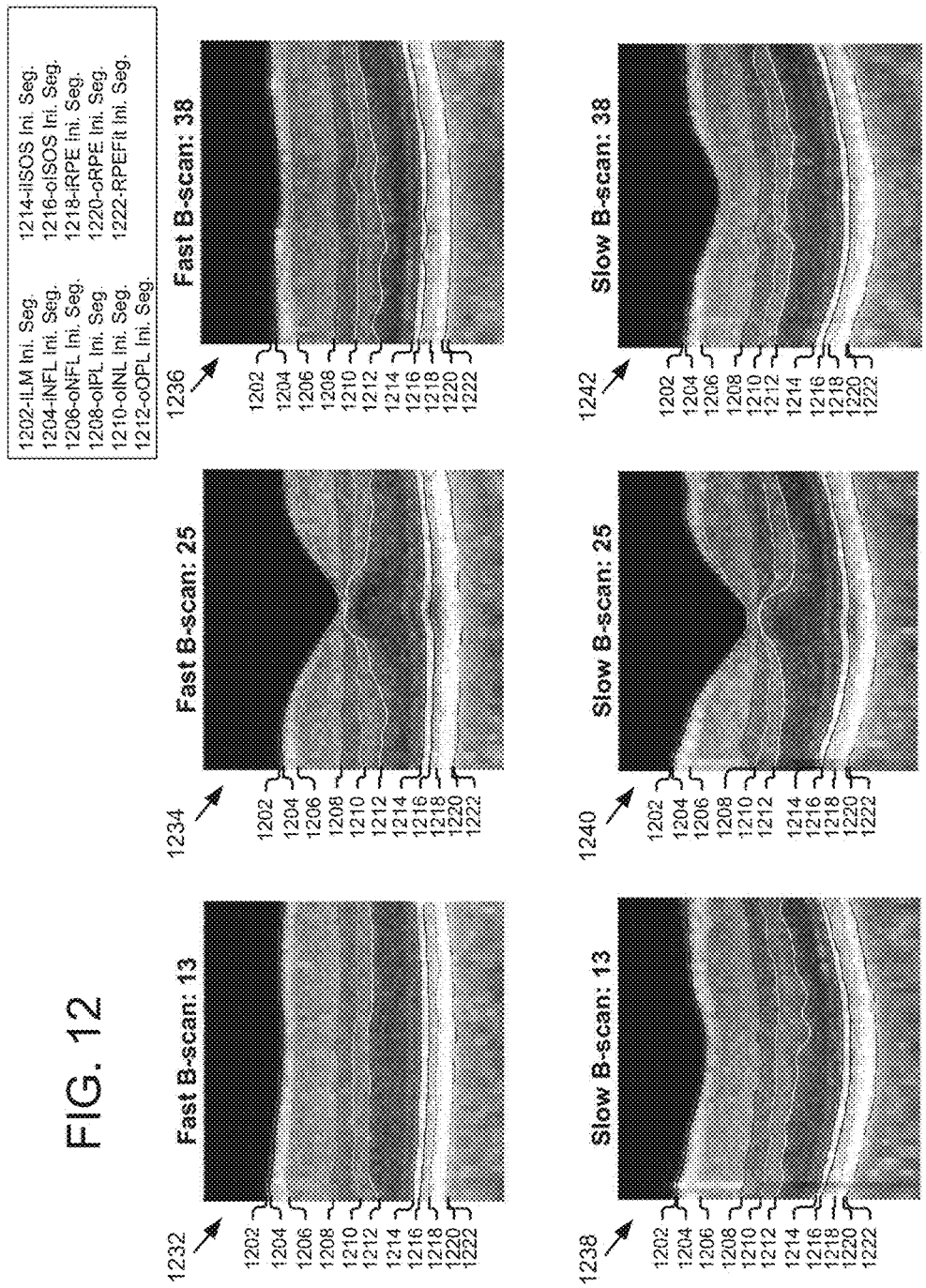
FIG. 12 illustrates an example of boundary initialization, displaying a set of retinal layers identified for three horizontal B-scans (on top, labeled as "Fast B-scan") and three vertical B-scans (on bottom, labeled as "Slow B-scan") from the same OCT cube.

The initial estimation of each layer can be also filtered to follow a smooth behavior of given characteristics as typically expected in retinal boundaries. This filtering process can be done by for example, using a Laplacian operator. An example of boundary initialization can be observed in FIG. 12, displaying a set of retinal layers identified for three horizontal B-scans 1232, 1234, and 1236 (on top, labeled as "Fast B-scan") and three vertical B-scans 1238, 1240, and 1242 (on bottom, labeled as "Slow B-scan") from the same OCT cube. In each of these B-scans 1202-1212, initial estimation of the ILM (1202), iNFL (1204), oNFL (1206), oIPL (1208), oINL (1210), oOPL (1212), iISOS (1214), oISOS (1216), iRPE (1218), oRPE (1220), and RPEFit (1222) layer boundaries are done.

Figure 13:
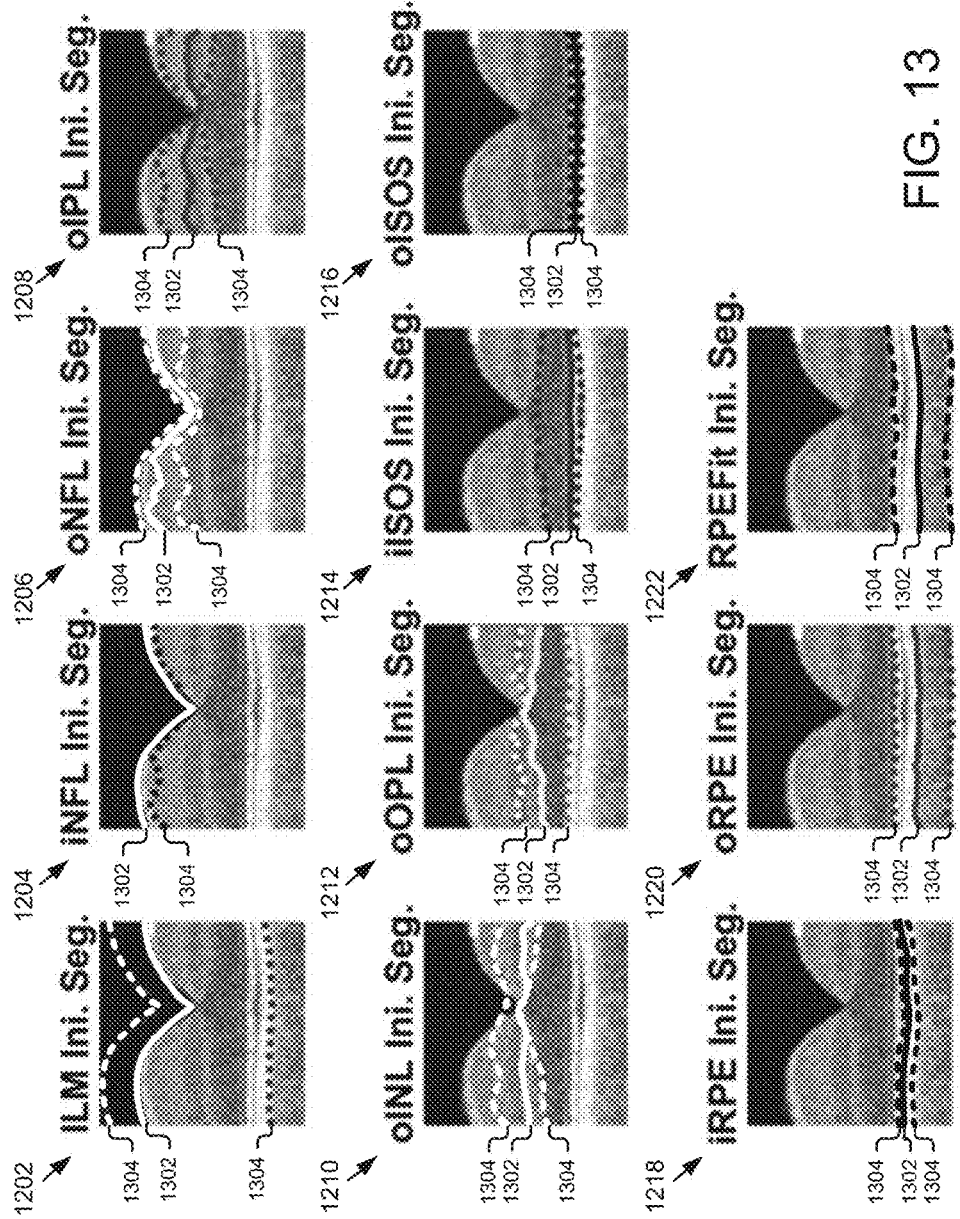
FIG. 13 illustrates an example of search windows associated to an initialization of retinal layers, with the initialization shown by the continuous lines and the search windows indicated by the discontinuous lines.

Apart from providing a first estimation of the location of the retinal layers, this boundary initialization step can be used to construct a set of search windows (step 414 in FIG. 4) and positional cost functions (step 416 in FIG. 4) associated with each particular retinal layer that can help in subsequent segmentation steps. Search windows can be interpreted as regions of interest within the OCT data that are associated to a particular retinal layer, and are generated by assuming a given possible deviation from the layer initialization that can be layer-specific while also considering the interactions between the initialization of all the considered layers. Subsequent segmentation steps can be restricted to such search windows, providing a more robust behavior and also reducing algorithm complexity. An example of search windows associated to an initialization of retinal layers can be seen in FIG. 13, with the initialization shown by the continuous lines (1302) and the search windows indicated by the discontinuous lines (1304). Positional cost functions are generated by assigning a probability map to the OCT data that relates to the chances that a particular boundary is located at each particular location and are generated using the initial estimation of each layer and their associated search windows. Positional cost functions are layer-dependent, and can be generated so that higher probability values are given to those locations within the associated search window, increasing their value for locations closer to the associated initial layer estimation. For example, such functions can be modulated by defining sigmoid functions at each A-scan location reaching a maximum value at the layer initialization location and with given roll-off and axial offset depending on the values of the search windows.

Example Computer System

Figure 14:
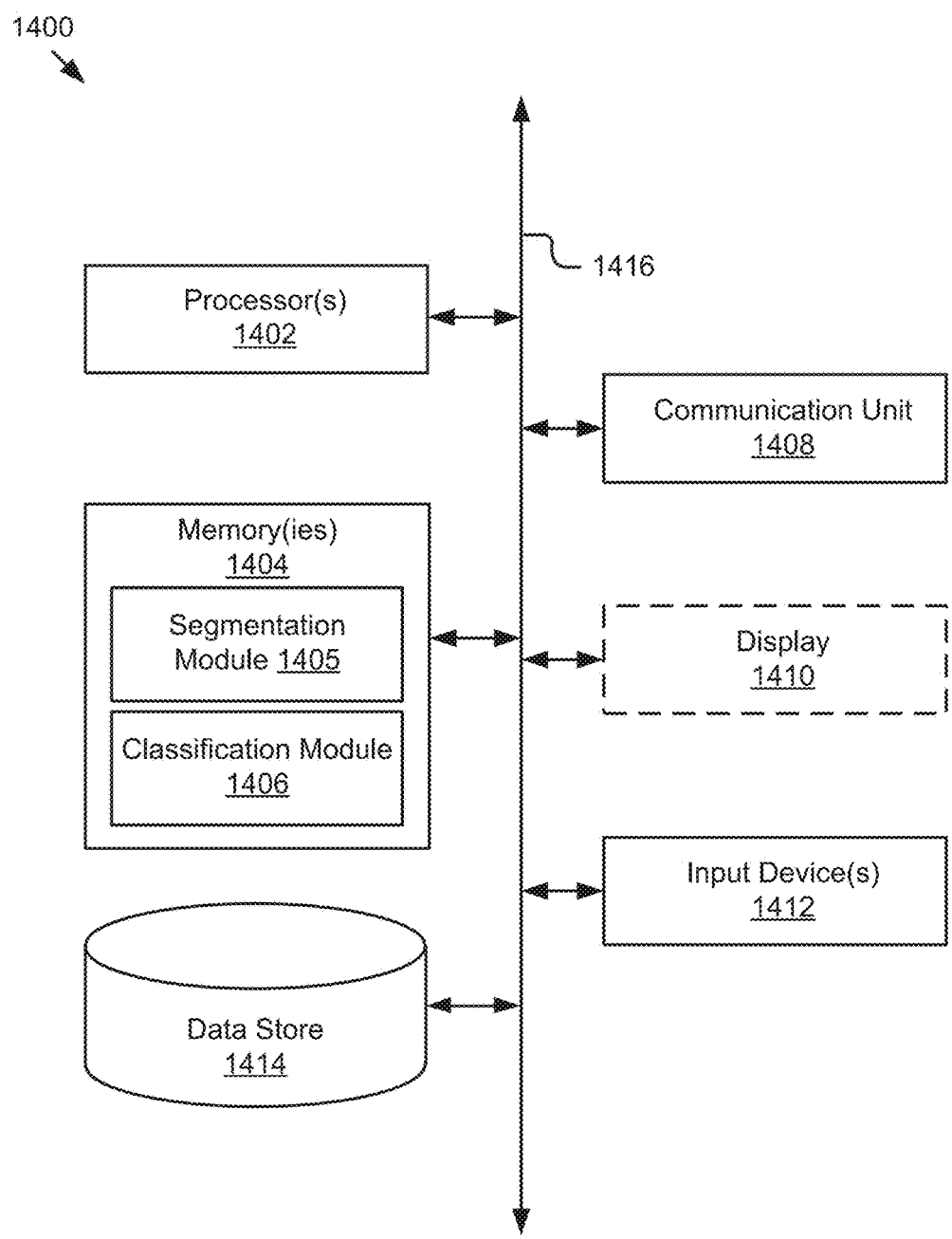
FIG. 14 is a block diagram of an example computer system configured to perform the functions discussed in the present application.

The processing unit 221 that has been discussed herein in reference to FIG. 2 can be implemented with a computer system configured to perform the functions that have been described herein for this unit. For instance, the processing unit 221 can be implemented with the computer system 1400, as shown in FIG. 14. The computer system 1400 may include one or more processors 1402, one or more memories 1404, a communication unit 1408, an optional display 1410, one or more input devices 1412, and a data store 1414. The display 1410 is shown with dotted lines to indicate it is an optional component, which, in some instances, may not be a part of the computer system 1400. In some embodiments, the display 1410 discussed herein is the display 222 that has been discussed herein in reference to FIG. 2.

The components 1402, 1404, 1408, 1410, 1412, and 1414 are communicatively coupled via a communication or system bus 1416. The bus 1416 can include a conventional communication bus for transferring data between components of a computing device or between computing devices. It should be understood that the computing system 1400 described herein is not limited to these components and may include various operating systems, sensors, video processing components, input/output ports, user interface devices (e.g., keyboards, pointing devices, displays, microphones, sound reproduction systems, and/or touch screens), additional processors, and other physical configurations.

The processor(s) 1402 may execute various hardware and/or software logic, such as software instructions, by performing various input/output, logical, and/or mathematical operations. The processor(s) 1402 may have various computing architectures to process data signals including, for example, a complex instruction set computer (CISC) architecture, a reduced instruction set computer (RISC) architecture, and/or architecture implementing a combination of instruction sets. The processor(s) 1402 may be physical and/or virtual, and may include a single core or plurality of processing units and/or cores. In some embodiments, the processor(s) 1402 may be capable of generating and providing electronic display signals to a display device, such as the display 1410, supporting the display of images, capturing and transmitting images, performing complex tasks including various types of feature extraction and sampling, etc. In some embodiments, the processor(s) 1402 may be coupled to the memory(ies) 1404 via a data/communication bus to access data and instructions therefrom and store data therein. The bus 1416 may couple the processor(s) 1402 to the other components of the computer system 1400, for example, the memory(ies) 1404, the communication unit 1408, or the data store 1414.

The memory(ies) 1404 may store instructions and/or data that may be executed by the processor(s) 1402. In the depicted embodiment, the memory(ies) 1404 stores at least a segmentation module 1405 and a classification module 1406, each of which may include software, code, logic, or routines for performing any and/or all of the techniques described herein. For instance, the segmentation module 1405 may perform all or some of the operations depicted in FIG. 3 and FIG. 4, and the classification module 1406 may perform all or some of the operations depicted in FIGS. 5, 6, 7a, and 7b. In some embodiments, the memory(ies) 1404 may also be capable of storing other instructions and data including, for example, an operating system, hardware drivers, other software applications, databases, etc. The memory(ies) 1404 are coupled to the bus 1416 for communication with the processor(s) 1402 and other components of the computer system 1400. The memory(ies) 1404 may include a non-transitory computer-usable (e.g., readable, writeable, etc.) medium, which can be any apparatus or device that can contain, store, communicate, propagate or transport instructions, data, computer programs, software, code, routines, etc. for processing by or in connection with the processor(s) 1402. A non-transitory computer-usable storage medium may include any and/or all computer-usable storage media. In some embodiments, the memory(ies) 1404 may include volatile memory, non-volatile memory, or both. For example, the memory(ies) 1404 may include a dynamic random access memory (DRAM) device, a static random access memory (SRAM) device, flash memory, a hard disk drive, a floppy disk drive, a CD ROM device, a DVD ROM device, a DVD RAM device, a DVD RW device, a flash memory device, or any other mass storage device known for storing instructions on a more permanent basis.

The computer system for the processing unit 121 may include one or more computers or processing units at the same or different locations. When at different locations, the computers may be configured to communicate with one another through a wired and/or wireless network communication system, such as the communication unit 1408. The communication unit 1408 may include network interface devices (I/F) for wired and wireless connectivity. For example, the communication unit 1408 may include a CAT-type interface, USB interface, or SD interface, transceivers for sending and receiving signals using Wi-Fi™; Bluetooth®, or cellular communications for wireless communication, etc. The communication unit 1408 can link the processor(s) 1402 to a computer network that may in turn be coupled to other processing systems.

The display 1410 represents any device equipped to display electronic images and data as described herein. The display 1410 may be any of a conventional display device, monitor or screen, such as an organic light-emitting diode (OLED) display, a liquid crystal display (LCD). In some embodiments, the display 1410 is a touch-screen display capable of receiving input from one or more fingers of a user. For example, the device 1410 may be a capacitive touch-screen display capable of detecting and interpreting multiple points of contact with the display surface.

The input device(s) 1412 are any devices for inputting data on the computer system 1400. In some embodiments, an input device is a touch-screen display capable of receiving input from one or more fingers of the user. The functionality of the input device(s) 1412 and the display 1410 may be integrated, and a user of the computer system 1400 may interact with the system by contacting a surface of the display 1410 using one or more fingers. In other embodiments, an input device is a separate peripheral device or combination of devices. For example, the input device(s) 1412 may include a keyboard (e.g., a QWERTY keyboard) and a pointing device (e.g., a mouse or touchpad). The input device(s) 1412 may also include a microphone, a web camera, or other similar audio or video capture devices.

The data store 1414 can be an information source capable of storing and providing access to data. In the depicted embodiment, the data store 1414 is coupled for communication with the components 1402, 1404, 1408, 1410, and 1412 of the computer system 1400 via the bus 1416, and coupled, via the processor(s) 1402, for communication with the segmentation module 1405 and the classification module 1406. In some embodiments, the segmentation module 1405 and the classification module 1406 are configured to manipulate, i.e., store, query, update, and/or delete, data stored in the data store 1414 using programmatic operations.

In the above description, for purposes of explanation, numerous specific details are set forth in order to provide a thorough understanding of the specification. It should be apparent, however, that the subject matter of the present application can be practiced without these specific details. It should be understood that the reference in the specification to "one embodiment", "some embodiments", or "an embodiment" means that a particular feature, structure, or characteristic described in connection with the embodiment is included in one or more embodiments of the description. The appearances of the phrase "in one embodiment" or "in some embodiments" in various places in the specification are not necessarily all referring to the same embodiment(s).

The foregoing description of the embodiments of the present subject matter has been presented for the purposes of illustration and description. It is not intended to be exhaustive or to limit the present embodiment of subject matter to the precise form disclosed. Many modifications and variations are possible in light of the above teaching. It is intended that the scope of the present embodiment of subject matter be limited not by this detailed description, but rather by the claims of this application. As will be understood by those familiar with the art, the present subject matter may be embodied in other specific forms without departing from the spirit or essential characteristics thereof.

The invention claimed is:

1. A method to analyze interferometric imaging data of an eye comprising:
   (a) collecting interferometric image data of the eye with an optical coherence tomography (OCT) system, said OCT system including a light source for generating a light beam, said light beam being divided along sample and reference paths, with the light in the sample path being directed to the eye and wherein light returning from the sample and reference paths is combined on a detector and wherein the output of the detector is supplied to a processor and wherein steps (b) to (f) are performed in a processor;
   (b) identifying a set of features in the image data, said set of features including edges or sections of surfaces of retinal structures;
   (c) associating a first subset of identified features with known retinal structures using prior knowledge;
   (d) determining a first set of characteristic metrics for the first subset of features;
   (e) determining a second set of characteristic metrics for a second subset of identified features, the second subset of features not being sufficiently recognizable as known retinal structures;
   (f) comparing the first and second set of characteristic metrics in order to associate the second subset of features with the known retinal structures associated with the first subset of features; and
   (g) storing the results of the associations or a further analysis thereof in a memory or displaying the results of the associations or a further analysis thereof on a display.

2. The method as recited in claim 1 further comprising:
   prior to identifying the set of features, dividing the interferometric image data into a set of patches, wherein said patches are defined as having common attributes;
   performing the steps (b)-(f) for each patch;
   stitching the results from step (f) for each patch together; and
   storing or displaying the stitched results or a further analysis thereof.

3. The method as recited in claim 2, in which the common attributes are based on size, resolution, alignment, intensity, structural, and statistical properties.

4. The method as recited in claim 1, in which the first set of characteristic metrics is used to build an unsupervised machine learning classifier.

5. The method as recited in claim 4, in which the second subset of features are associated using the unsupervised machine learning classifier.

6. The method as recited in claim 1, in which edges in the first subset of features are assembled into segments prior to the determining the first set of characteristic metrics for that subset.

7. The method as recited in claim 6, in which the length of the segments are evaluated prior to determining the first set of characteristic metrics.

8. The method as recited in claim 1, in which the first subset and the second subset of features are from two or more retinal layers or boundaries.

9. The method as recited in claim 8, in which edges from the two or more retinal layers or boundaries are associated simultaneously.

10. The method as recited in claim 1, in which the prior knowledge comprises one or more of a length, a location, a gradient class, continuity, parallelism, structural, and statistical properties.

11. The method as recited in claim 1, in which the characteristic metrics comprise statistical properties of the image data.

12. The method as recited in claim 11, in which the characteristic metrics comprise statistical properties of the image data near the associated features.

13. The method as recited in claim 1, wherein associating the second subset of features in step (f) is based on identification of similar characteristic metrics between the first set and the second set.

14. The method as recited in claim 1, further comprising:
   responsive to performing the step (c), performing a step (c1) to identify additional features to include in the first subset of features; and
   iterating steps (c) and (c1) until a pre-determined condition is satisfied.

15. The method as recited in claim 14, in which the pre-determined condition is that the first subset includes sufficient features to build an unsupervised machine learning classifier, said classifier used to associate the second subset of features with the retinal structures.

16. The method as recited in claim 15, in which the second subset of features are associated by a different segmentation method.

* * * * *

UNITED STATES PATENT AND TRADEMARK OFFICE
CERTIFICATE OF CORRECTION

PATENT NO. : 10,169,864 B1
APPLICATION NO. : 15/246036
DATED : January 1, 2019
INVENTOR(S) : Homayoun Bagherinia et al.

It is certified that error appears in the above-identified patent and that said Letters Patent is hereby corrected as shown below:

In the Specification

In Column 3, Line 6, delete "(see" and insert -- (See --, therefor.

In Column 18, Line 64, delete "before $S_i$;" and insert -- before $S_j$ --, therefor.

In Column 19, Line 3, delete " $P_s(S_i, S_j) = e^{-k \times d(M_i, M_j)}$, " and insert -- $P_s(S_i, S_j) = e^{-k \times d(M_i, M_j)}$ --, therefor.

Signed and Sealed this
Sixteenth Day of July, 2019

Andrei Iancu
*Director of the United States Patent and Trademark Office*